(12) United States Patent
Kato

(10) Patent No.: US 6,955,345 B2
(45) Date of Patent: Oct. 18, 2005

(54) INCLINING AND ROTATING TABLE APPARATUS

(75) Inventor: Heizaburo Kato, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 0 days.

(21) Appl. No.: 10/689,548

(22) Filed: Oct. 21, 2003

(65) Prior Publication Data

US 2004/0146369 A1 Jul. 29, 2004

(30) Foreign Application Priority Data

Oct. 22, 2002 (JP) .......................................... 2002-307297
Sep. 19, 2003 (JP) .......................................... 2003-328855

(51) Int. Cl.$^7$ .................................................. B23Q 3/18
(52) U.S. Cl. ........................................... 269/61; 269/60
(58) Field of Search .............................. 269/61, 60, 74, 269/57

(56) References Cited

U.S. PATENT DOCUMENTS

| 2,445,016 | A | * | 7/1948 | Bentley ........................ 269/59 |
| 3,273,879 | A | * | 9/1966 | Floren ........................... 269/61 |
| 5,097,718 | A | | 3/1992 | Sahara |
| 5,918,510 | A | | 7/1999 | Uemura et al. |
| 6,705,019 | B2 | * | 3/2004 | Mauro ........................... 33/569 |
| 2002/0006764 | A1 | | 1/2002 | Hanisch et al. |
| 2004/0146369 | A1 | * | 7/2004 | Kato ............................ 409/219 |

FOREIGN PATENT DOCUMENTS

| EP | 1 216 788 | 6/2002 |
| EP | 1 323 494 | 7/2003 |
| JP | 2000359491 | 6/2000 |
| JP | 2001-269829 | 10/2001 |
| JP | 2002-130422 | 5/2002 |

OTHER PUBLICATIONS

European Office Action dated Dec. 2, 2004.

* cited by examiner

*Primary Examiner*—Lee D. Wilson
(74) *Attorney, Agent, or Firm*—Morrison & Foerster LLP

(57) ABSTRACT

An inclining and rotating table apparatus comprises a rotating table device having a rotating table, and a support base for rotatably supporting the rotating table having a shaft body provided perpendicular to a rotation axis of the rotating table, and a base for rotatably supporting the rotating table device using the shaft body. A table surface of the rotating table is inclined by making the rotating table device rotate. A first V-shaped groove is directly formed in the shaft body along its rotating direction. The base has a second V-shaped groove opposing the first V-shaped groove. A cross roller bearing is structured by providing rolling bodies, which are placed in contact with the first and second V-shaped grooves and are capable of rolling therebetween, between the shaft body and the base, and arranging a rolling axis of a rolling body perpendicular to that of an adjacent rolling body.

14 Claims, 16 Drawing Sheets

INCLINING AND ROTATING TABLE APPARATUS

CROSS-REFERENCE TO RELATED APPLICATIONS

The present application claims priority upon Japanese Patent Application No. 2002-307297 filed Oct. 22, 2002 and Japanese Patent Application No. 2003-328855 filed Sep. 19, 2003, which are herein incorporated by reference.

BACKGROUND OF THE INVENTION

1. Field of the Invention

The present invention relates to an inclining and rotating table apparatus for making a table surface of a rotating table incline by rotating a rotating table device having the rotating table rotatably supported by a support base.

2. Description of the Related Art

As an inclining and rotating table apparatus for making a table surface of a rotating table incline by rotating a rotating table device, there is known, for example, an inclined indexing round table which is attached on a work table of a machine tool such as a machining center (for example, refer to page 4 and FIG. 1 of Japanese Patent Application Laid-open Publication No. 2001-269829). With this inclined indexing round table, two oscillating shafts which are made to project horizontally from the support base of the rotating table device are supported respectively to two opposing columns which are provided on the main body side, in such a manner that the oscillating shafts are able to oscillate. A worm wheel is fitted to each oscillating shaft. By controlling a servomotor attached to a worm which engages with the worm wheel, each oscillating shaft is made to rotate in order to make the rotating table device incline, thereby indexing an inclined position of the rotating table.

Recently with the development of high performance electronic devices, their various parts have become smaller and higher in density, and machine tools or the like that process these various parts are also required to have high precision. Thus, it has become difficult to comply with such requirements with the precision that can be realized by conventional tools. Particularly, with a device used for continuous processing of extremely complicated curved surfaces for an inclining and rotating table apparatus, for example, even a slight eccentricity or play in the rotating table holding the workpiece, as well as in a mechanism for making the rotating table incline, will cause somewhat of a processing error in the processed components. Therefore, with the inclining and rotating table apparatus which is required an especially high process precision, there is a problem that, in addition to precision at which the rotating table is indexed, the mechanism that makes the rotating table incline also has to be ensured a high indexing precision.

Bearing structures could be major factors that render a rotating table and a mechanism for making the rotating table incline unable to ensure adequate degree of precision. Some of the reasons why a bearing that has been once assembled causes decrease in precision later on will be explained, taking a general roller bearing as an example.

1: In some cases, a gap (d) exists between the outer surface of an output shaft (a) and an inner surface of an inner race (c) of a bearing (b) with which the outer peripheral surface of the output shaft (a) contacts. As illustrated in FIG. 12, although the outer surface of the output shaft (a) and also the inner surface of the inner race (c) of the bearing (b) may be both fabricated to a perfectly round shape, if the finished measurement of the bearing (b) is too large, the gap (d) will be formed at the time the bearing is assembled. Due to this gap (d), the rotation centerline (e) of the output shaft (a), which rotates with the motion obtained by the cam mechanism, is misaligned with the rotation centerline (f) of the bearing (b). Thus, not only is high operational precision unobtainable, but also the position of gap (d) changes due to the shift in weight, thus causing abrasion between the output shaft (a) and the inner race (c) and resulting in a shortened life of the device.

2: In some cases, the outer surface of the output shaft (a) does not have a perfectly round shape. In order to prevent the problem described in the above 1, generally, interference fit is used. As shown in FIG. 13, however, if the outer surface of the output shaft (a) is not a round shape and has even a slight recess or a protrusion, then even if the inner race (c) of the bearing (b) is shaped with a satisfactory precision, when the inner race (c) is assembled to the output shaft (a), the recess or the protrusion similar to the outer surface of the output shaft (a) will appear on the inner race (c), thus distorting a bearing race surface (h) where the rollers (g) rotate. When the rollers rotate on the bearing race surface (h), due to the recesses and the protrusions of the bearing race surface (h), excessive pressure is applied to some portions of the bearing race surface (h), while some rollers fail to contact the race surface, thus making the rotating accuracy of the rollers unstable and the rotation center unstable. As a result, it is difficult for the device to operate with a high degree of precision. Moreover, excessive pressure applied between the rollers (g) and the race surface (h) causes excessive wear that shortens the life of the device.

3: In some cases, the inner surface of the inner race (c) of the bearing (b) may have recesses or protrusions. As shown in FIG. 14A which is a view before attaching the output shaft (a) and FIG. 14B which is a view after attaching the output shaft (a), if there are recesses and protrusions on the inner surface of the inner race (c) according to a different pattern from the pattern for the above-mentioned 2, then, even if the outer shape of the output shaft (a) is a perfect circle, the protruding sections on the inner surface of the inner race (c) will be pushed out by the output shaft (a), and, on the other side thereof, protruding sections will also be formed on the race surface (h) of the inner race (c). As a result, recesses and protrusions will appear on the race surface (h) of the inner race (c), thus causing the same problems as those in the above-mentioned 2.

4: In some cases, the end surface (i) of the bearing (b) is not at right angles to the output shaft (a). As shown in FIG. 15, usually an abutting portion (j) such as a flange is made to abut against the end surface (i) of the bearing (b) in order to fix the bearing (b). When the bearing (b) is abutted against the abutting portion (j), in cases where there are processing remainders on the abutting portion (j) or where dust and/or chippings are sandwiched between the bearing (b) and the abutting portion (j), the bearing (b) will be fixed in an inclined state with respect to the output shaft (a). The resulting decrease in operational precision is similar to the situation in above 1 and is such that the rotation center (f) of the bearing (b) is inclined with respect to the rotation center (e) of the output shaft (a), and therefore stable rotation cannot be obtained. These problems occur between the output shaft (a) and the inner race (c) of the bearing (b) assembled thereto.

Even when high precision type bearings which are thus commercially available are used, it is difficult to ensure high indexing precision of the table surface of the rotating table due to various factors. For this reason, there has been a need for a technique that enables high precision processing with respect to a workpiece held on a rotating table.

SUMMARY OF THE INVENTION

The present invention has been made in view of conventional problems, and an object thereof is to provide an inclining and rotating table apparatus that is capable of ensuring high precision in indexing the angle at which a table surface of a rotating table is inclined.

A main aspect of the present invention is an inclining and rotating table apparatus comprising: a rotating table device having a rotating table, and a support base for rotatably supporting the rotating table, the support base having at least one shaft body that is provided in a direction perpendicular to a rotation axis of the rotating table; and a base for rotatably supporting the rotating table device using the shaft body as a rotation shaft, wherein: a table surface of the rotating table is inclined by making the rotating table device rotate; a first V-shaped groove is directly formed in the shaft body along the rotating direction thereof; the base has a second V-shaped groove opposing the first V-shaped groove; and a cross roller bearing is structured by providing a plurality of rolling bodies between the shaft body and the base, the rolling bodies being placed in contact with the first V-shaped groove and the second V-shaped groove and being capable of rolling between the shaft body and the base, and arranging a rolling axis of a rolling body, among the rolling bodies, perpendicular to a rolling axis of an adjacent rolling body.

Features of the present invention other than the above will become clear by reading the following description with reference to the accompanying drawings.

BRIEF DESCRIPTION OF THE DRAWING

In order to facilitate further understanding of the present invention and the advantages thereof, reference is now made to the following description taken in conjunction with the accompanying drawings wherein.

DETAILED DESCRIPTION OF THE INVENTION

Figure 1:
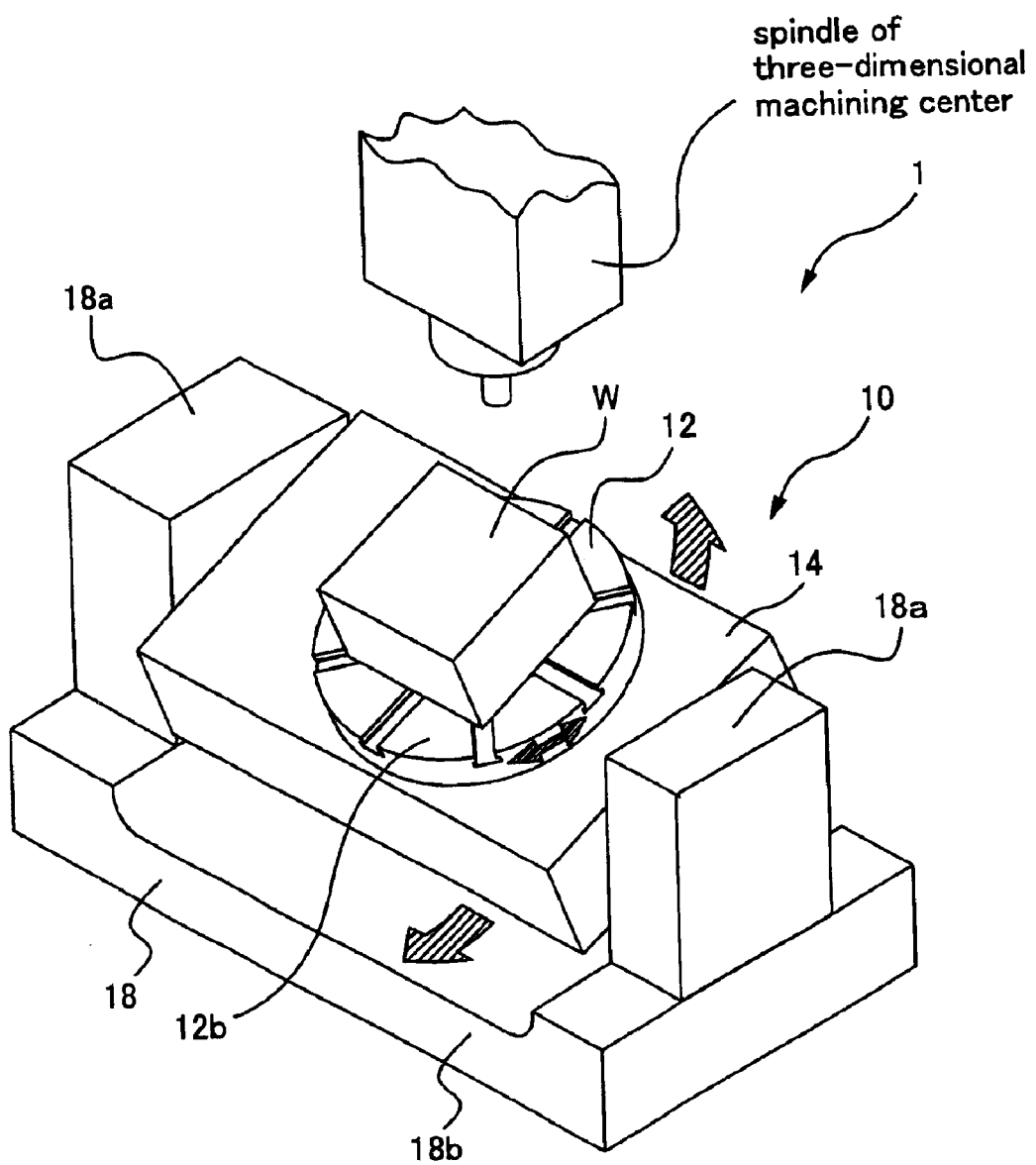
FIG. 1 is a perspective view of an embodiment of an inclining and rotating table apparatus of the present invention.

At least the following matters will be made clear by the description in the present specification and the accompanying drawings.

A main aspect of the present invention is an inclining and rotating table apparatus comprising: a rotating table device having a rotating table, and a support base for rotatably supporting the rotating table, the support base having at least one shaft body that is provided in a direction perpendicular to a rotation axis of the rotating table; and a base for rotatably supporting the rotating table device using the shaft body as a rotation shaft, wherein: a table surface of the rotating table is inclined by making the rotating table device rotate; a first V-shaped groove is directly formed in the shaft body along the rotating direction thereof; the base has a second V-shaped groove opposing the first V-shaped groove; and a cross roller bearing is structured by providing a plurality of rolling bodies between the shaft body and the base, the rolling bodies being placed in contact with the first V-shaped groove and the second V-shaped groove and being capable of rolling between the shaft body and the base, and arranging a rolling axis of a rolling body, among the rolling bodies, perpendicular to a rolling axis of an adjacent rolling body.

According to such an inclining and rotating table apparatus, eccentricity, play and the other like problems in a mechanism for making the rotating table device incline can be effectively suppressed, and therefore, a high indexing accuracy can be ensured for the mechanism for making the rotating table device incline. Thus, it becomes possible to process the workpiece with high accuracy.

Further, it is preferable that: the inclining and rotating table apparatus further comprises an input shaft body for inputting power to the shaft body, the input shaft body having a cam surface whose phase is displaced in the axial direction of the input shaft body as the input shaft body rotates; the shaft body has a plurality of cam followers, the cam followers being provided at regular intervals on the outer circumference of the shaft body in the circumferential direction thereof, and the cam followers being placed in contact with the cam surface of the input shaft body to roll therewith; and rotation of the input shaft body causes the plurality of cam followers to subsequently engage the cam surface to make the rotating table device rotate.

According to such an inclining and rotating table apparatus, the shaft body can be driven with high accuracy, and therefore, highly accurate processing with respect to the workpiece is possible.

Further, it is preferable that: the rotating table has a shaft portion as a center of rotation of the rotating table; a third V-shaped groove is directly formed in the shaft portion along the rotating direction thereof; the support base has a fourth V-shaped groove opposing the third V-shaped groove; and a cross roller bearing is structured by providing a plurality of rolling bodies between the shaft portion and the support base, the rolling bodies being placed in contact with the third V-shaped groove and the fourth V-shaped groove and being capable of rolling between the shaft portion and the support base, and arranging a rolling axis of a rolling body, among the rolling bodies, perpendicular to a rolling axis of an adjacent rolling body.

According to such an inclining and rotating table apparatus, eccentricity, play and the other like problems in a mechanism for making the rotating table device rotate can be effectively suppressed, and therefore, a high indexing accuracy can be ensured for the mechanism for making the rotating table device rotate. Thus, it becomes possible to process the workpiece with higher accuracy.

Further, it is preferable that: one of the at least one shaft body is provided on the support base on one side of the rotating table device, and another one of the at least one shaft body is provided on the support base on the other side of the rotating table device; the first V-shaped groove is directly formed in the shaft body provided on the one side; a fifth V-shaped groove is directly formed in the shaft body provided on the other side; and the base has a sixth V-shaped groove opposing the fifth V-shaped groove.

According to such an inclining and rotating table apparatus, both sides of the rotating table device can be supported with high accuracy, and therefore, the rotating accuracy of the rotating table device can be increased.

Further, it is preferable that: the rotating table has a holding mechanism for holding a workpiece; and the workpiece held by the holding mechanism is made to incline and rotate by making the rotating table rotate, and making the table surface of the rotating table incline by making the rotating table device rotate.

According to such an inclining and rotating table apparatus, the workpiece held by the holding mechanism can be processed at high accuracy.

Further, it is preferable that the input shaft body is driven by a motor.

Further, it is preferable that the motor is arranged so that it cannot be seen from outside the base.

According to such an inclining and rotating table apparatus, since the motor is arranged so that it cannot be seen from outside the base, the decrease in rotation accuracy caused by dust and the like adhering on the motor can be suppressed.

Further, it is preferable that: power of the motor is transmitted to the input shaft body through a gear; and the gear is arranged so that it cannot be seen from outside the base.

According to such an inclining and rotating table apparatus, since the gear is arranged so that it cannot be seen from outside the base, the decrease in rotation accuracy caused by dust and the like adhering on the gear can be suppressed. Further, the power of the motor is transmitted to the input shaft through the gear, so that by changing the axle ratio by the gear, it becomes possible to easily increase the rotation torque of the motor or easily set the rotation speed to an adequate value. Further, by using the gear, there is an advantage that restriction on the arrangement of the motor can be lessened.

Further, it is preferable that power of the motor is transmitted to the input shaft body without using a gear.

According to such an inclining and rotating table apparatus, the apparatus can be miniaturized. Further, since the gear become unnecessary, the number of components may be lessened. Further, the problems unique to gears, such as decreased precision due to backlash or decreased precision due to distortion in the gear itself, will not occur, and therefore, positioning precision will increase.

Further, it is preferable that: the inclining and rotating table apparatus further comprises a drive shaft for inputting power to the shaft portion, the drive shaft having a cam surface whose phase is displaced in the axial direction of the drive shaft as the drive shaft rotates; the shaft portion has a plurality of cam followers, the cam followers being provided at regular intervals on the outer circumference of the shaft portion in the circumferential direction thereof, and the cam followers being placed in contact with the cam surface of the drive shaft to roll therewith; and rotation of the drive shaft causes the plurality of cam followers to subsequently engage the cam surface to make the rotating table rotate.

According to such an inclining and rotating table apparatus, the shaft portion can be driven with high accuracy, and therefore, processing of the workpiece with a higher accuracy is possible.

Further, it is preferable that the drive shaft is driven by a second motor.

Further, it is preferable that the second motor is arranged so that it cannot be seen from outside the support base.

According to such an inclining and rotating table apparatus, the second motor is arranged so that it cannot be seen from outside the support base, and therefore, decrease in rotating accuracy due to dust and the like adhering on the second motor can be suppressed.

Further, it is preferable that: power of the second motor is transmitted to the drive shaft through a gear; and the gear is arranged so that it cannot be seen from outside the support base.

According to such an inclining and rotating table apparatus, since the gear is arranged so that it cannot be seen from outside the support base, the decrease in rotation accuracy caused by dust and the like adhering on the gear can be suppressed. Further, the power of the second motor is transmitted to the drive shaft through the gear, so that by changing the axle ratio by the gear, it becomes possible to easily increase the rotation torque of the second motor or easily set the rotation speed to an adequate value. Further, by using the gear, there is an advantage that restriction on the arrangement of the second motor can be lessened.

Further, it is preferable that power of the second motor is transmitted to the drive shaft without using a gear.

According to such an inclining and rotating table apparatus, the rotating table device can be miniaturized. Further, since the gear become unnecessary, the number of components may be lessened. Further, the rotating table device will be reduced in weight, and therefore, the output of the power source for driving the rotating table device can also be reduced. Further, the problems unique to gears, such as decreased precision due to backlash or decreased precision due to distortion in the gear itself, will not occur, and therefore, positioning precision will increase.

According to an inclining and rotating table apparatus of the present invention, eccentricity, play and other like problems in the mechanism for making the rotating table device incline can be effectively suppressed, and therefore, high indexing accuracy of the mechanism for making the rotating table device incline can be ensured. Thus, it becomes possible to process the workpiece with high accuracy.

Further, the first V-shaped groove, with which the rolling bodies contact and in which they roll, of the cross roller bearing structured between the base and the shaft body, which serves as a the rotation shaft for making the rotating table device incline, is formed directly in the shaft body. Therefore, the first V-shape groove can be formed at the same time as when processing the shaft body. That is, when processing the first V-shaped groove, the groove can be processed without taking the shaft body out, and therefore, the rotation axis of the shaft body and the center axis of the first V-shape groove can be matched, thereby eliminating positional misalignment almost completely. Thus, when assembling a conventional, commercially-available bearing, it is possible to eliminate problems such as decrease in accuracy due to assembling the bearing caused, for example, by eccentricity of the bearing attachment portion provided in the two members and decrease in movement precision due to distortion in the path of the rolling bodies cause by protrusions and recesses in the inner ring etc.

As described above, in the present invention, a cross roller bearing is adopted in the inclining and rotating table apparatus that is used for processing requiring extremely high processing precision. Further, the V-shaped groove that constitutes the cross roller bearing is formed directly in the shaft body. In this way, it is possible to eliminate all the causes of deterioration in precision seen in conventional bearing structures, and thus, it becomes possible to provide an inclining and rotating table apparatus having extremely high precision in setting an inclination angle.

Further, the inclining and rotating table apparatus may be configured so that the rotation of an input shaft body having a cam surface, whose phase is displaced in the axial direction of the input shaft body with the rotation thereof, causes a plurality of cam followers to subsequently engage the cam surface and rotate. In this way, it is possible to position the inclination angle of the rotating table at high precision.

More preferably, in the inclining and rotating table apparatus according to the present invention, a cross roller bearing is adopted also in the rotating mechanism of the rotating table device. Accordingly, it becomes possible to provide an inclining and rotating table apparatus that comprises a rotating table device having extremely high precision in movement. That is, by causing the rotating table device having high precision in movement to oscillate using the oscillating mechanism that is capable of performing positioning at high angular precision, it is possible to easily process smooth and continuous curves, and it becomes possible for the apparatus to achieve superior performance.

===First Embodiment===

Figure 2:
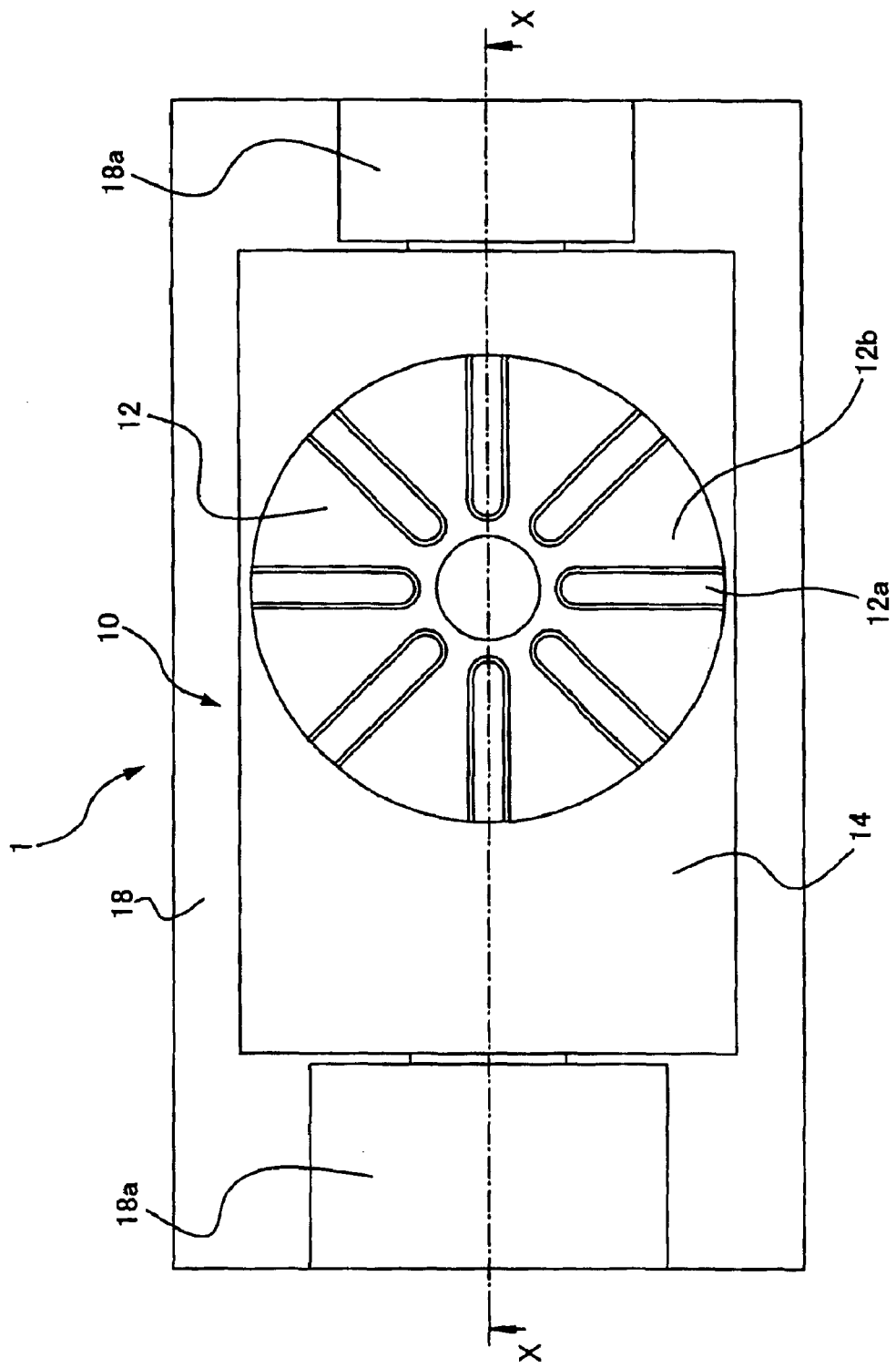
FIG. 2 is a plan view of the inclining and rotating table apparatus shown in FIG. 1.
Figure 3:
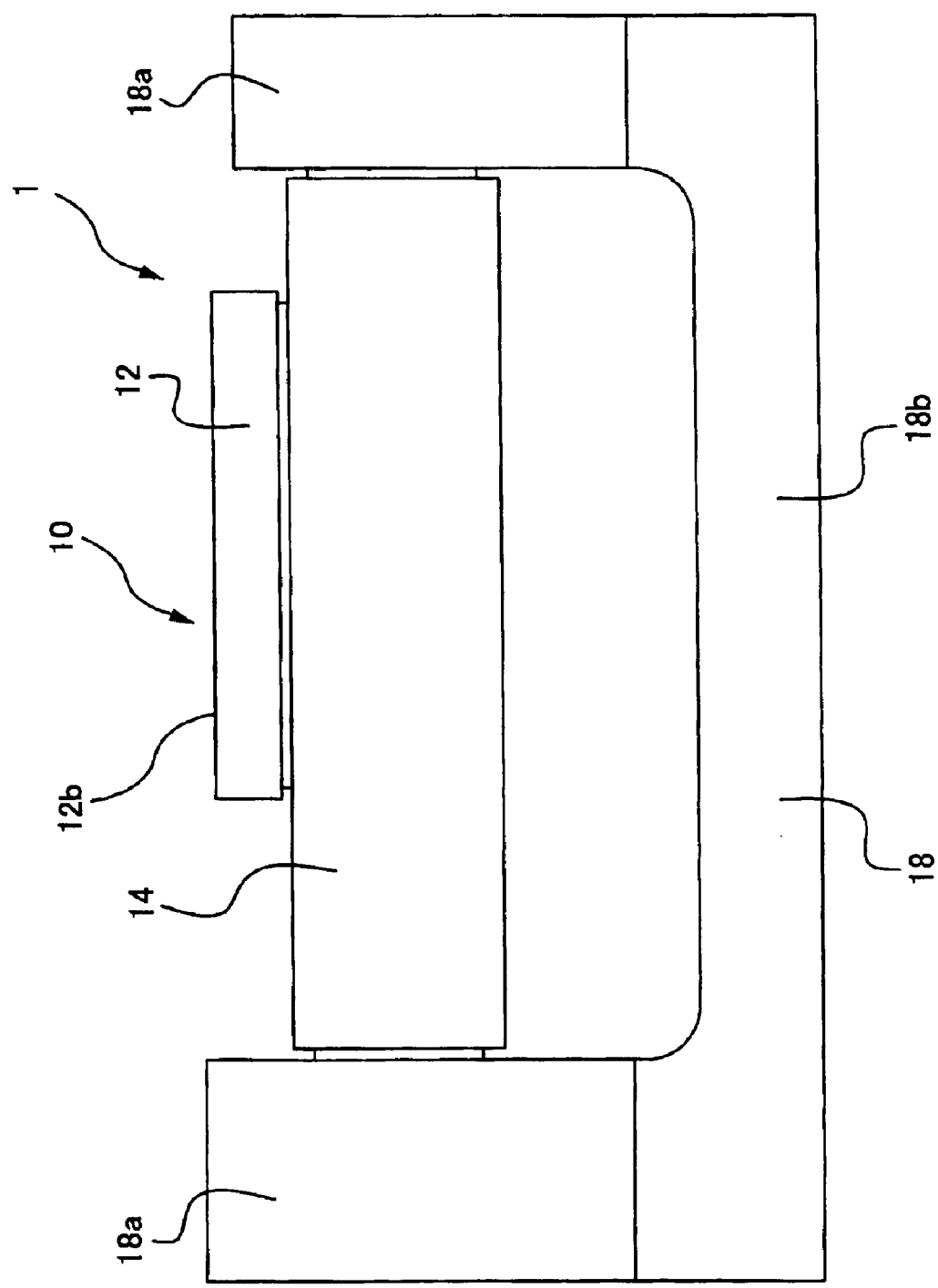
FIG. 3 is a front view of the inclining and rotating table apparatus shown in FIG. 1.
Figure 4:
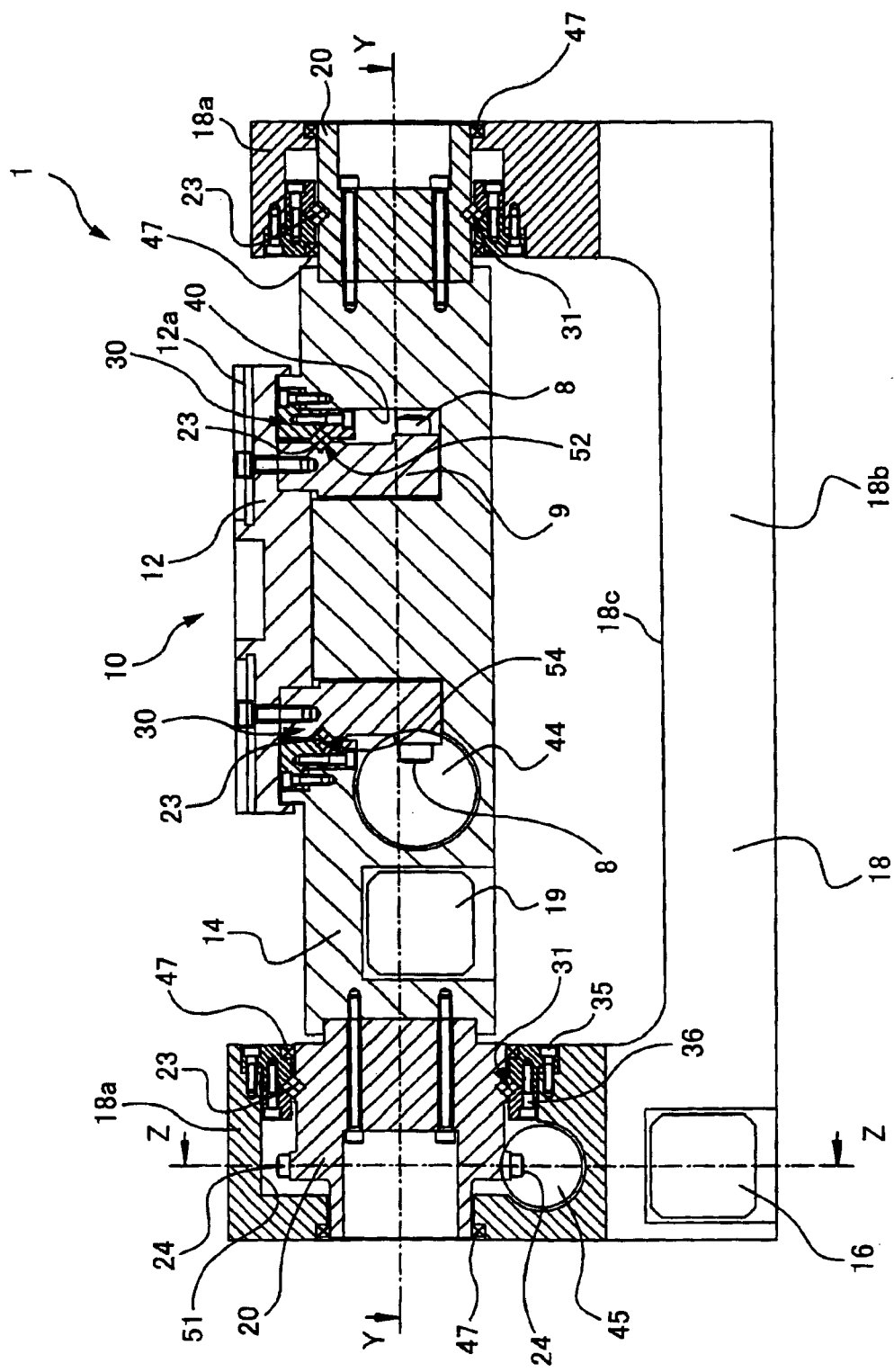
FIG. 4 is a cross sectional view of FIG. 2 taken along line X—X.
Figure 5:
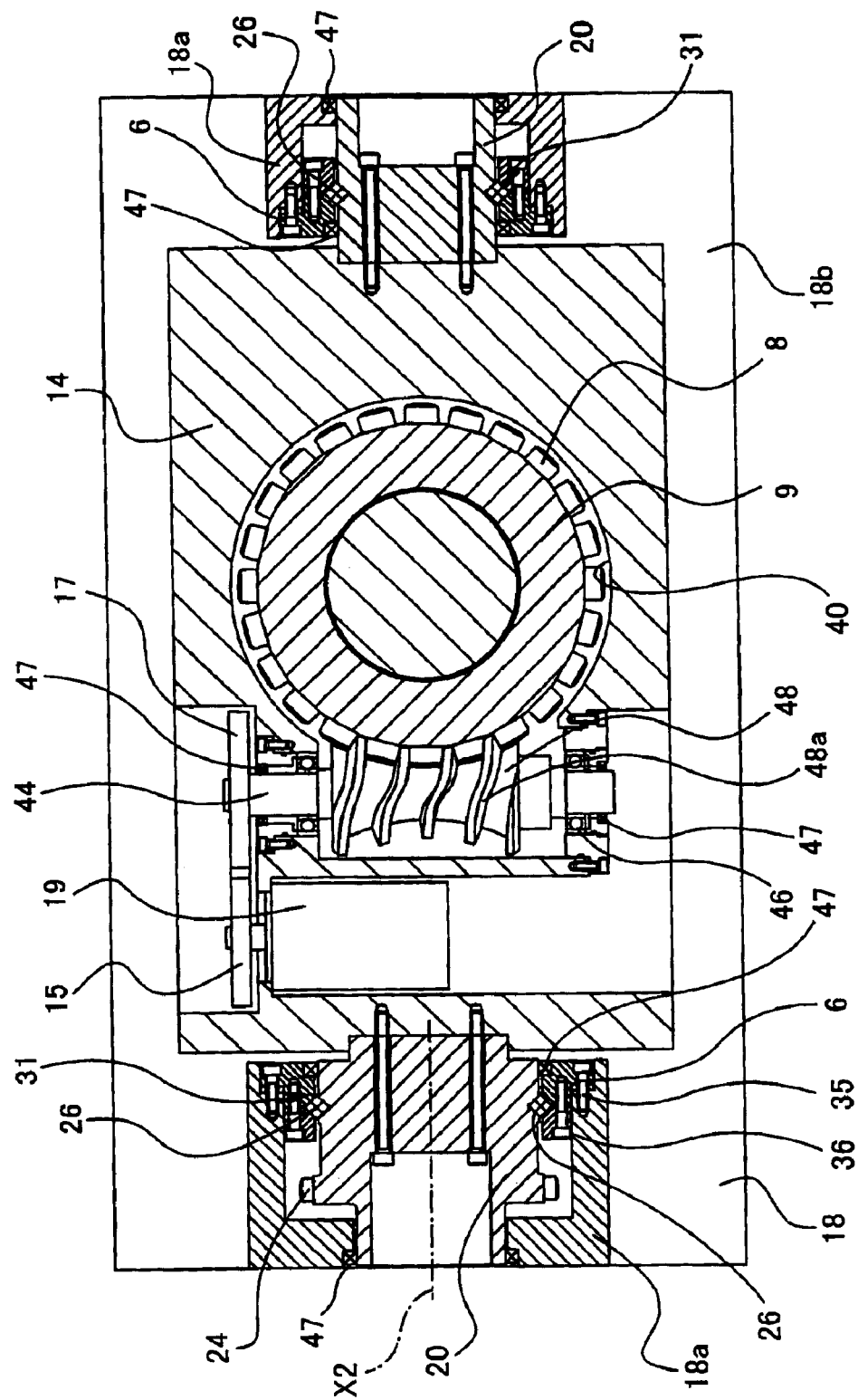
FIG. 5 is a cross sectional view of FIG. 4 taken along line Y—Y.
Figure 6:
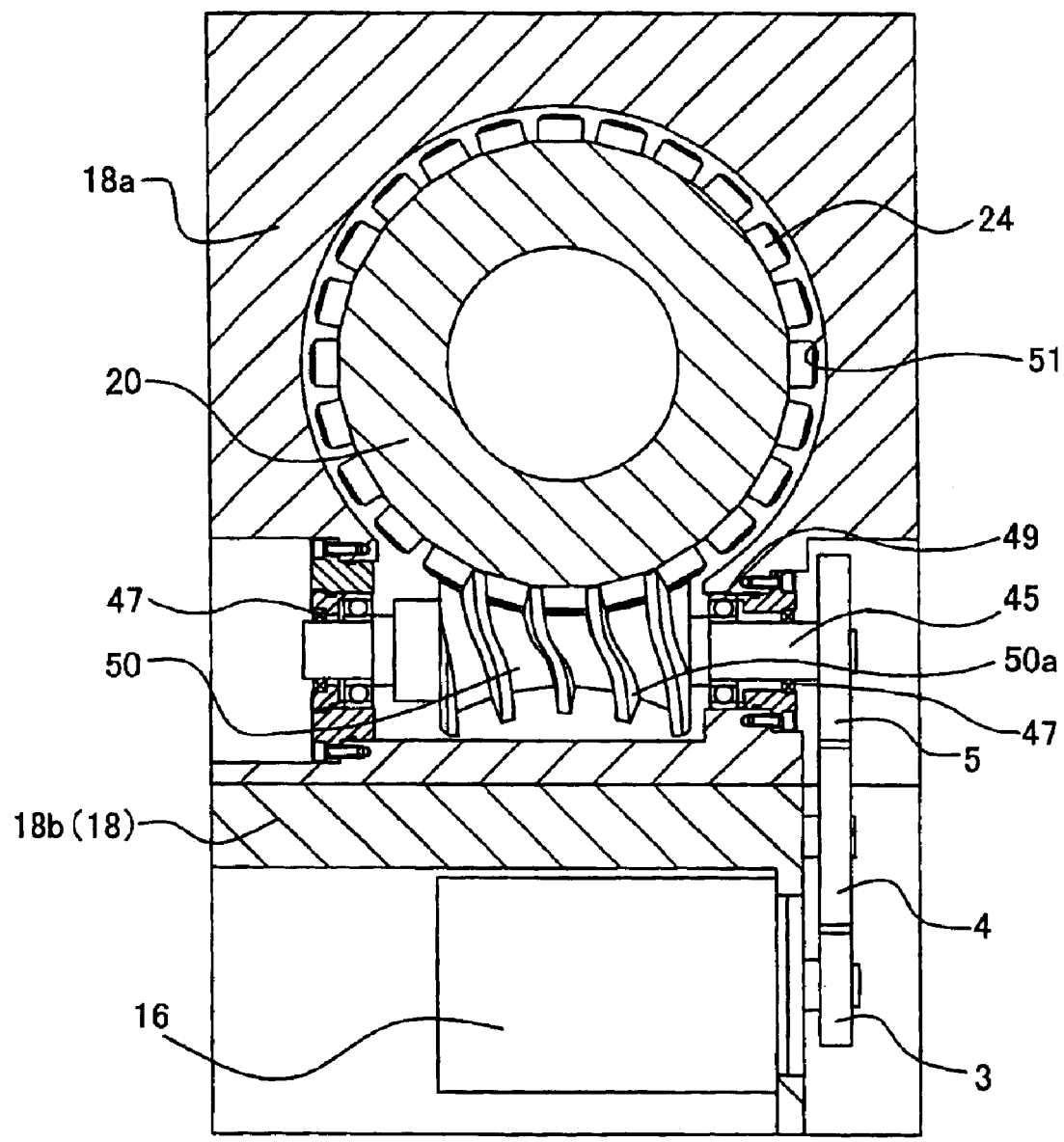
FIG. 6 is a cross sectional view of FIG. 4 taken along line Z—Z.

Hereinbelow, the first embodiment of the present invention will be explained in detail with reference to the attached drawings. FIG. 1 through FIG. 6 depict an embodiment of an inclining and rotating table apparatus of the present invention. FIG. 1 is a perspective view of an embodiment of the inclining and rotating table apparatus of the present invention, FIG. 2 is a plan view of the inclining and rotating table apparatus shown in FIG. 1, FIG. 3 is a front view of the inclining and rotating table apparatus shown in FIG. 1, FIG. 4 is a cross sectional view of FIG. 2 taken along line X—X, FIG. 5 is a cross sectional view of FIG. 4 taken along line Y—Y, and FIG. 6 is a cross sectional view of FIG. 4 taken along line Z—Z.

The inclining and rotating table apparatus 1 of this embodiment comprises, for example: a rotating table device 10 that comprises a rotating table 12 as a rotating table that rotates while holding a workpiece that is processed by, for example, a three-dimensional machining center, and a support base 14 that rotatably supports the rotating table 12; and a base 18 rotatably supporting the support base 14 in order to make the rotating table device 10 oscillate.

As described above, the rotating table device 10 comprises the rotating table 12 that holds the workpiece, and the support base 14 that rotatably supports the rotating table 12. As shown in FIG. 2, an upper surface of the rotating table 12, namely a table surface 12b, is provided with slide grooves 12a for sliding a block that structures a chuck for holding the workpiece. These slide grooves 12a are provided radially from the center of the rotating table 12. Cross roller bearings 30 are used as the bearing for this rotating table 12 and the support base 14. Details of the cross roller bearing will be described later on. Note that, in this embodiment, the slide grooves 12a (and chucks) structure a holding mechanism for holding the workpiece.

A turret 9, which structures a shaft portion serving as a rotating shaft, is provided below a lower surface of the rotating table 12. At the lower portion of the outer peripheral surface of the turret 9 are provided a plurality of cam followers 8 that are arranged at regular intervals along the peripheral direction of the turret 9.

A drive shaft 44 for inputting drive force to the rotating table 12 is rotatably supported to the support base 14 by a pair of bearing members 46. This drive shaft 44 is provided with a roller gear cam 48, which serves as a cam. This roller gear cam 48 has a cam surface 48a whose phase is displaced in the axial direction as the drive shaft 44 rotates, and this cam surface 48a and the cam followers 8 of the turret 9 mesh with each other. Here, as the roller gear cam mechanism, there is used a globoidal cam that does not cause backlash not only when it is stopped, but also when it is indexing. A hole 40 in the support base 14 is provided with oil for lubricating the roller gear cam 48 and the cam followers 8.

When power of a motor 19 is transmitted to the drive shaft 44 via gears 15, 17, the drive shaft 44 rotates with respect to the support base 14. When the drive shaft 44 rotates, the roller gear cam 48 also rotates, and the cam followers 8, which mesh with the roller gear cam 48, subsequently engage with the cam surface 48a. The rotation drive force is thus transmitted to the rotating table 12, and the rotating table 12 rotates around the rotation axis of the turret 9. Note that, the motor 19 and the gears 15, 17 are arranged so that they cannot be seen from the outside of the support base 14.

The support base 14 has a rectangular shape in a plan view. A cylindrical oscillating turret 20, which structures a shaft body serving as the rotating shaft, protrudes from the surface of each opposite side of the support base 14. These two oscillating turrets 20 are arranged so the axis of one of the turrets is on the same line as the axis of the other turret, and are provided in a direction perpendicular to the rotation axis of the rotating table 12. These oscillating turrets 20 are supported by the base 18, and the rotating table device 10 oscillates, using the oscillating turrets 20 as the shafts for oscillation.

The base 18 comprises a base portion 18b positioned below the rotating table device 10, and two device support portions 18a that are provided on the base portion 18b. The two device support portions 18a are arranged on the sides of the oscillating turrets 20 so as to sandwich the rotating table device 10. In the rotating table device 10, which is arranged in between the device support portions 18a, the oscillating turrets 20 are rotatably supported in between the device support portions 18a and are made to oscillate, making the table surface 12b incline. Further, the base portion 18b in between the two device support portions 18a is formed with a recessed portion 18c on its top surface, so that when the rotating table device 10 oscillates, the lower part of the support base 14 does not contact the base portion 18b.

An input shaft 45, which serves as an input shaft body for inputting drive force to make the rotating table device 10 oscillate, is rotatably supported with respect to the base 18 by a pair of bearing members 49. This input shaft 45 is provided with a roller gear cam 50, which serves as a cam. This roller gear cam 50 has a cam surface 50a whose phase is displaced in the axial direction as the input shaft 45 rotates, and this cam surface 50a and cam followers 24 of the oscillating turret 20 mesh with each other. Here, as the roller gear cam mechanism, there is used a globoidal cam that does not cause backlash not only when it is stopped, and also when it is indexing.

A hole 51 in each device support portion 18a of the base 18 is provided with oil for lubricating the roller gear cam 50 and the cam followers 24. This oil is prevented from leaking outside of the base 18 by, for example, a seal member 47.

When power of a motor 16 is transmitted to the input shaft 45 via gears 3, 4, 5, the input shaft 45 rotates with respect to the base 18. When the input shaft 45 rotates, the roller gear cam 50 also rotates, and the cam followers 24 that mesh with the roller gear cam 50 subsequently engage with the cam surface 50a. The rotation drive force is transmitted to the rotating table device 10, and the rotating table device 10 rotates about the axis of the oscillating turret 20. Note that, the motor 19 and the gears 3, 4, 5, are arranged so that they cannot be seen from outside the base 18.

Generally, the above-described cross roller bearing mainly utilizes a plurality of rolling bodies. These rolling bodies are formed in a cylindrical shape or as "rollers" (simply called "rollers" below). Each of their axial centers of rolling (or, "rotating axes") is oriented a certain direction. The rollers are uniformly spaced and arranged in the circumferential direction of an annular gap that is formed between a rotating shaft body and a supporting body for supporting the rotating shaft body. The rollers are made, for example, to roll between an inner race of the inner ring installed to the internal rotating shaft body and an outer race of an outer ring installed to the external supporting body. In cases where the rotating shaft body is arranged on the outside and the supporting part is arranged on the inside, the inner ring is installed to the supporting body, and the outer ring is installed to the rotating shaft. Especially in a cross roller bearing, the rotating axis of each of the rollers is arranged so that it is inclined at an angle toward the rotation axis of the rotating shaft body, and also, the directions of the rotating axes of adjacent rollers are arranged so that they incline in opposite directions. A retainer is provided between the rotating shaft body and the supporting body in order to retain the rollers that roller therebetween. The basic structure of such a cross roller bearing is well known in the art.

The inclining and rotating table apparatus 1 of this embodiment uses cross roller bearings for both the rotating mechanism of the rotating table 12 and the oscillating mechanism of the rotating table device 10, and since the structures of the bearings are substantially the same, only the cross roller bearing 31 of the oscillating mechanism of the rotating table device 10 will be described as an example, with reference to FIG. 5 and FIG. 7 to FIGS. 11A and 11B.

Figure 7:
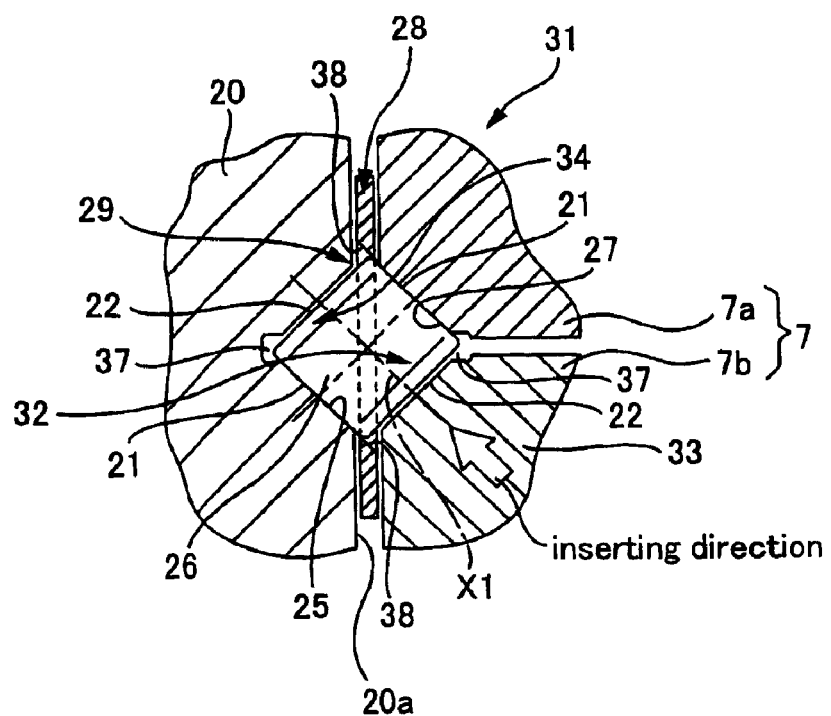
FIG. 7 is a detailed cross sectional side view showing the cross roller bearing of the bearing portion shown in FIG. 6.
Figure 8:
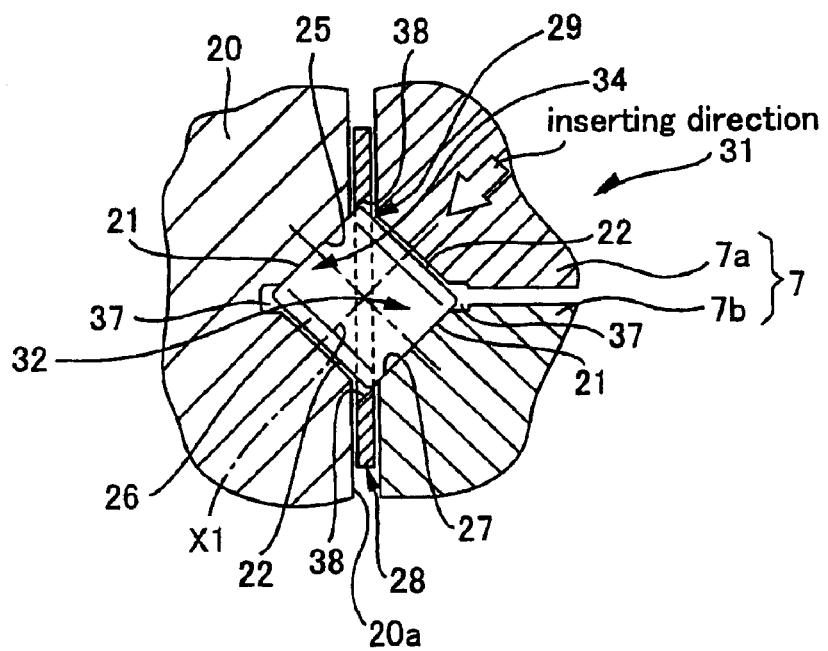
FIG. 8 is a detailed cross sectional side view showing the cross roller bearing of the bearing portion shown in FIG. 6, except that it shows a different position to that shown in FIG. 7.
Figure 9A:
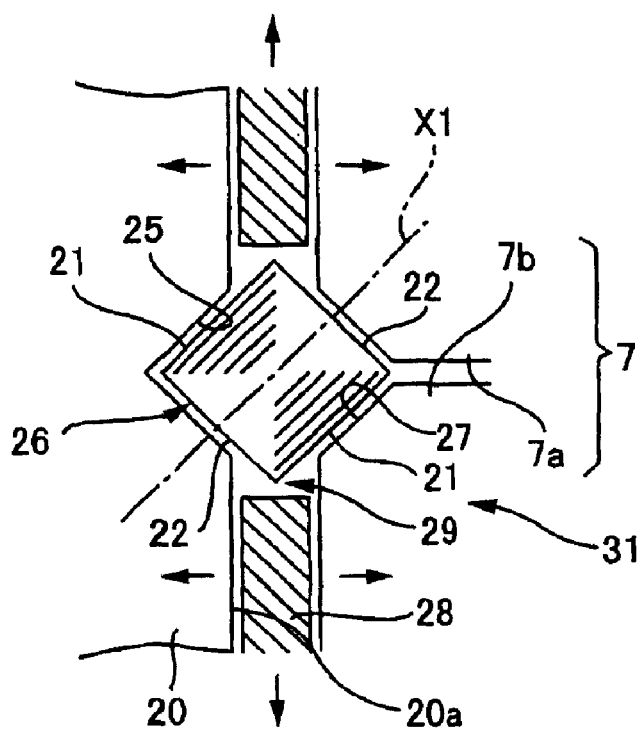
FIG. 9A and FIG. 9B are diagrams for explaining the problems of the assembled state of the rollers and the retainer.
Figure 9B:
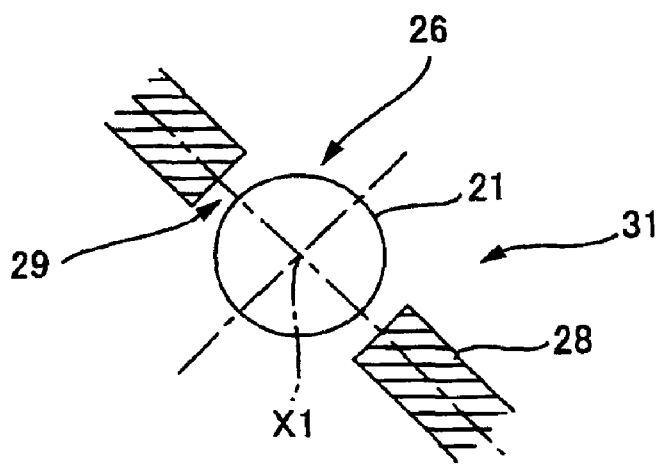
Figure 10A:
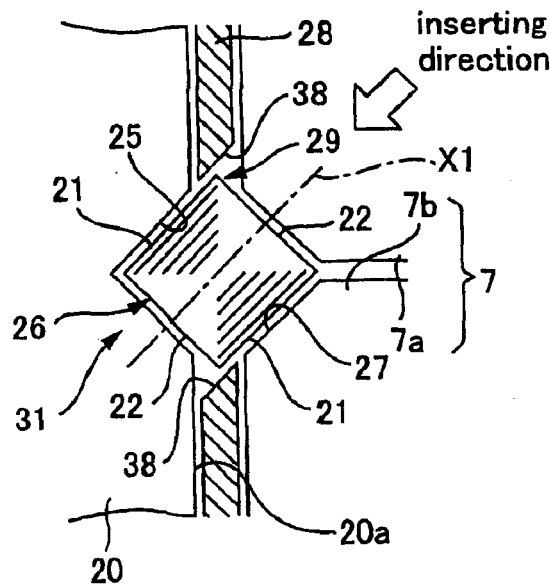
FIG. 10A and FIG. 10B are diagrams showing the state in which the rollers and the retainer of the bearing portion of FIG. 6 are assembled.
Figure 10B:
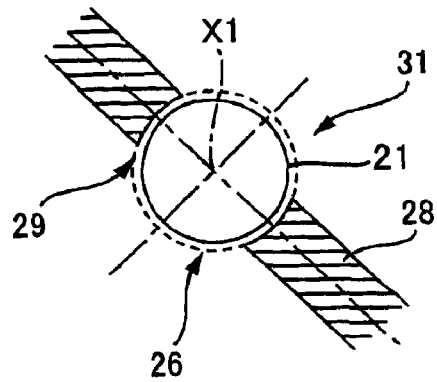
Figure 11A:
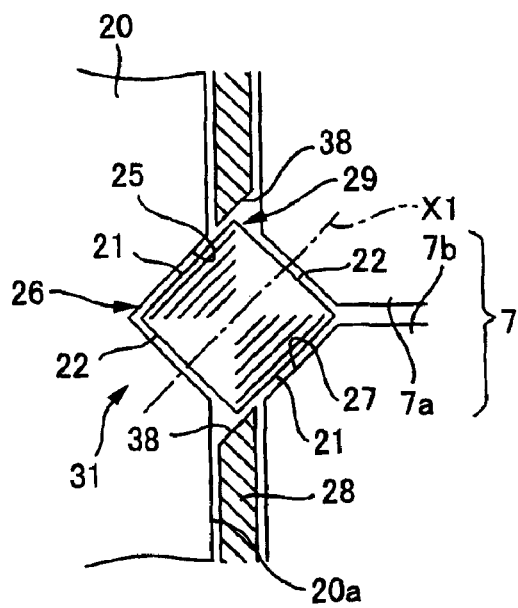
FIG. 11A and FIG. 11B are schematic cross sectional side views of two different positions for explaining the state in which the rollers and the retainer of the bearing portion of FIG. 6 are assembled.
Figure 11B:
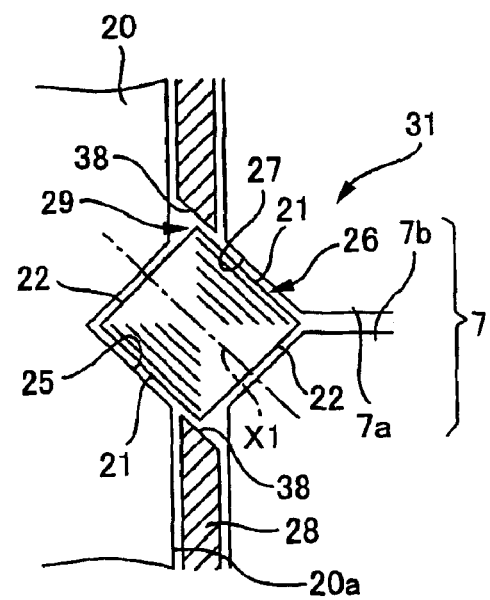
Figure 12:
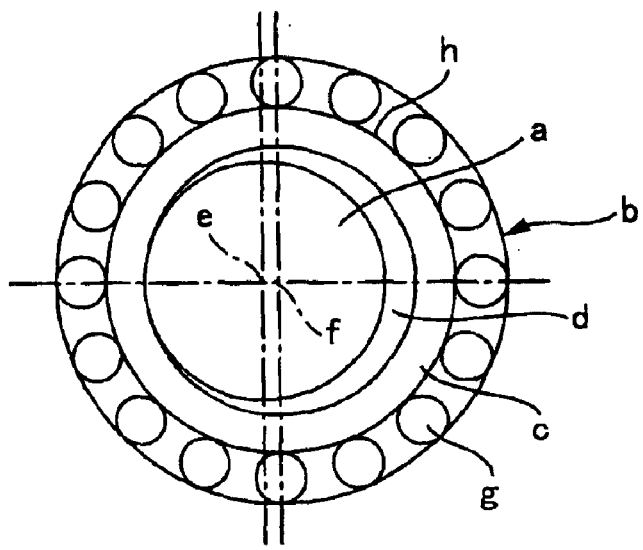
FIG. 12 is a diagram depicting one of the problems of a conventional bearing structure.
Figure 13:
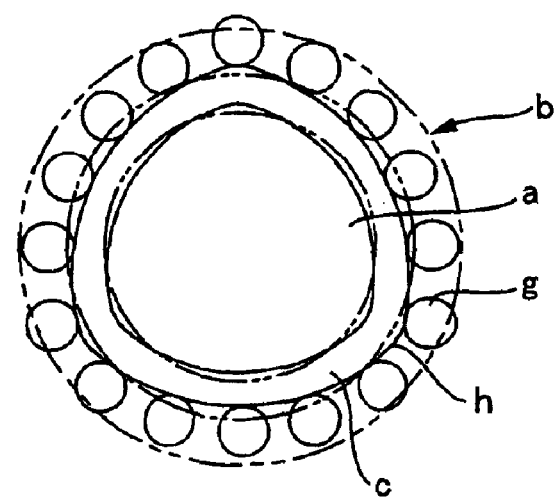
FIG. 13 is a diagram depicting another problem of a conventional bearing structure.
Figure 14A:
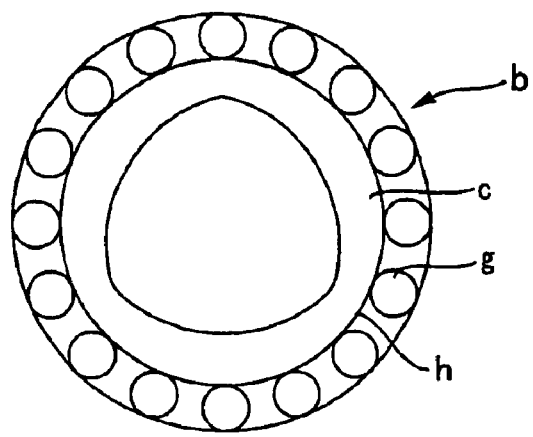
FIG. 14A and FIG. 14B are diagrams depicting still another problem of a conventional bearing structure.
Figure 14B:
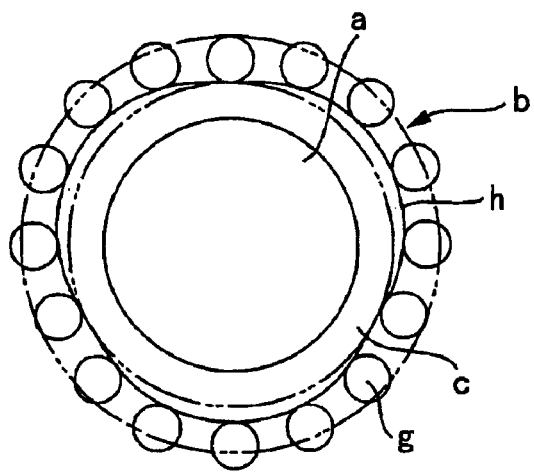
Figure 15:
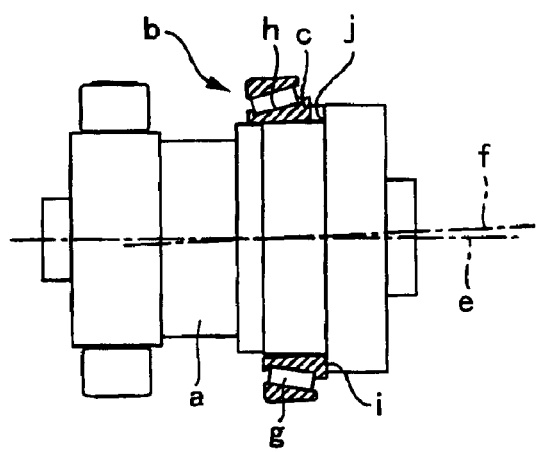
FIG. 15 is a diagram depicting an additional problem of a conventional bearing structure.

FIG. 7 is a detailed cross sectional side view showing the cross roller bearing of the bearing portion of the oscillating mechanism of the rotating table device, FIG. 8 is a detailed cross sectional side view of the cross roller bearing of the same bearing portion, showing a position different from that of FIG. 7, FIG. 9A and FIG. 9B are diagrams for explaining the problems of the assembled state of the rollers and the retainer, FIG. 10A and FIG. 10B are diagrams showing the state in which the rollers and the retainer of the bearing portion are assembled, and FIG. 11A and FIG. 11B are schematic cross sectional side views of two different positions for explaining the state in which the rollers and the retainer of the bearing portion are assembled.

Each oscillating turret 20 is supported by the base 18. The base 18 is structured by the device support portion 18a that has a hole 51 to insert the oscillating turret 20, and a ring assembly 7 that is fixed to the device support portion 18a and that is arranged slightly spaced from a peripheral surface 20a of the oscillating turret 20. The ring assembly 7 is structured by an outer ring member 7a positioned on the outside and an inner ring member 7b positioned on the inside, both being located inside the device support portion 18a. The edge of each of the outer ring member 7a and the inner ring member 7b that is located on the side of the oscillating turret 20 and on the side of the surface where both members 7a, 7b oppose each other is beveled at 45° along the whole periphery of each edge. The outer ring member 7a and the inner ring member 7b are fixed by bolt 36 with a slight gap between them. The beveled portions of both members form a second V-shaped groove 32 that is open toward the oscillating turret 20.

Further, in a position opposing the second V-shaped groove 32 of the ring assembly 7 fixed to the device support portion 18a, the oscillating turret 20 has a first V-shaped groove 34 that is open toward the ring assembly 7 and that is formed along the whole periphery of the turret 20.

Note that, the oscillating turret 20, which serves as the shaft body, is provided on both sides of the rotating table device 10. The first V-shaped groove 34 is formed directly in the oscillating turret 20 located on one side of the device 10. A fifth V-shaped groove is directly formed in the oscillating turret 20 on the other side of the device 10, and the base 18 has a sixth V-shaped groove opposing the fifth V-shaped groove.

Between the first V-shaped groove 34 of the oscillating turret 20 and the second V-shaped groove 32 of the ring assembly 7 are provided a plurality of cylindrical rollers 26. Each roller 26 has a cylindrical bearing surface 21 and a pair of flat end faces 22 located at both ends of the bearing surface 21. The rollers are arranged along the peripheral direction of the oscillating turret 20 at regular intervals. The rollers 26 are placed in contact with both an inner race 25, which is formed in the internal oscillating turret 20 and which forms the first V-shaped groove 34, and an outer race 27, which forms the second V-shaped groove 32 in the ring assembly 7 installed to the device support portion 18a so as to surround the periphery of the oscillating turret 20, and the rollers 26 are made to roll between the inner race 25 and the outer race 27. Furthermore, the rotating axis x1 of the roller 26 is arranged so that it is inclined toward rotation axis x2 of the oscillating turret 20. Further, as shown in FIG. 7 and FIG. 8, the rotating axis x1 of a certain roller 26 is inclined in a direction perpendicular to the rotation axis x1 of an adjacent roller 26. Furthermore, an annular space is provided between the oscillating turret 20 and the ring assembly 7 provided on the device support portion 18a. A thin cylindrical-shaped retainer 28 that is for retaining the rollers 26 is installed in this space in the circumferential direction thereof. A plurality of pocket orifices 29 are formed in a peripheral surface of the retainer 28. The pocket orifices 29 are spaced in accordance with the arrangement of the rollers 26 and are for fitting each of the rollers 26, individually.

In more detail, the oscillating turret 20 (which serves as a shaft body) has cam followers 24 that structure the cam mechanism when meshed with the roller gear cam 50. The cam followers 24 are provided substantially at the center, in the axial direction, of the oscillating turret 20 and in the circumferential direction (namely a rotating direction) thereof at adequate intervals. The ring assembly 7 is structured by an outer ring member 7a and an inner ring member 7b that is arranged slightly spaced apart from the outer ring member 7a. The outer ring member 7a is fixed to the device support portion 18a by unit-fixing bolts 35 through a flange portion 6 provided on the outer peripheral surface of the outer ring member 7a. The inner ring member 7b is fixed to the outer ring member 7a by assembly bolts 36.

The outer race 27 is formed on the inner circumferential side of the surface where the outer ring member 7a and the inner ring member 7b oppose each other, in the circumferential direction thereof. The outer race 27 has a V-shape cross section and either contacts, in a rolling manner, the bearing surface 21 of each of the rollers 26, which is arranged so as to incline toward the rotation axis x2 of the oscillating turret 20, or opposes the end surface 22 of each roller 26 with a slight clearance therefrom. The race 27 thus guides the rolling movement of the rollers 26 from outside.

On the other hand, the annular inner race 25 is formed on the outer circumferential surface of the oscillating turret 20 that opposes the outer race 27 of the ring assembly 7, in the circumferential direction thereof. The inner race 25 has a V-shape cross section and either contacts, in a rolling manner, the bearing surface 21 of each of the rollers 26, which are arranged in an inclined manner, or opposes the end surface 22 of each roller 26 with a slight clearance therefrom. The race 25 thus guides the rolling movement of the rollers 26 from inside. Particularly, this inner race 25 is formed by directly processing the oscillating turret 20 to create the first V-shaped groove 34 along the outer circumferential surface of the oscillating turret 20.

Further, a narrow channel 37 is formed at the bottom of the outer race 27, which is formed in the ring assembly 7, and the inner race 25, which is formed in the oscillating turret 20 to form the first V-shaped groove 34, along the circumferential direction of the outer race 27 and the inner race 25, respectively. These narrow channels 37 ensure supplying and discharging of oil to and from the rollers 26.

Further, as for each of the pocket orifices 29 formed in the retainer 28, which retains the rollers 26 whose rotating axes x1 are inclined in opposite directions, a tapered lip 38 is formed on the rim section of each of the orifices 29 that faces the bearing surface 21 of the roller 26 installed in that orifice 29. The lip 38 extends so as to gradually narrow the inner diameter of the pocket orifice 29 along the bearing surface 21, and this lip 38 is configured to support a portion of the bearing surface 21. Thus, when the roller 26 is inserted into the retainer 28, its end surface 22 is faced toward the pocket orifice 29 so that the bearing surface 21 abuts against the lip 38. Further, this lip 38 gives orientation to the shape of the pocket orifice 29. Thus, the roller 26 can be inserted from one side of the retainer 28, but the lip 38 blocks the roller 26 from being inserted from the other side. That is, the rollers 26, which roll with respect to the outer race 27 and the inner race 25, are inserted into the retainer 28 from different directions and retained thereby so that the bearing surfaces 21 of the rollers 26 face different directions. For this purpose, the lips 38 for supporting such bearing surfaces 21 are formed in the retainer 28 in the direction from which each of these rollers 26 is inserted.

In the inclining and rotating table apparatus 1 that comprises the cross roller bearing 31 thus configured, the inner race 25 is formed by directly processing the oscillating turret 20, which is a component part that has high rigidity. Therefore, it is possible to form an inner race 25 that is close to a perfect circle with no processing distortions. As a result, it is possible to resolve the problem that the shape of the inner race 25 is distorted because of the recesses and protrusions in, for example, the inner ring when commercially available bearings etc. are assembled. Particularly, by directly forming the inner race 25, which structures the first V-shaped groove 34, in the outer circumference of the oscillating turret 20 when processing the oscillating turret 20, and preferably at a timing close to when processing the oscillating turret 20, the center of the processed inner race 25 will completely match the center of the processed oscillating turret 20. Therefore, it is possible to make the center of rotation x2 of the oscillating turret 20 and the center of the inner race 25 of the cross roller bearing 31 match, and thereby eliminate any positional misalignment between the turret 20 and the bearing 31.

According to the present embodiment, the inner race 25 is formed directly in the oscillating turret 20. Therefore, it is possible to eliminate all the causes of deterioration in precision in conventional bearing structures, and it is possible to provide an inclining and rotating table apparatus 1 with an extremely high precision in movement, thus enabling high precision processing such as processing of complicated curved surfaces.

Furthermore, the rotation center x1 is inclined toward the rotation center x2 of the oscillating turret 20, and the rotation centers x1 of adjacent rollers 26 are inclined in different directions because the pocket orifices 29 of the retainer 28 restrain the inserting direction of the rollers 26. Thanks to this structure, a single cross roller bearing 31 is able to support both the radial and thrust loads applied to the oscillating turret 20, thus providing for a simplified inclining-and-rotating table apparatus 1 having few assembly errors.

Moreover, as for the pocket orifices 29, if the size of the pocket orifice 29 is such that a roller 26 can be installed from either sides of the retainer 28 as shown in FIG. 9A, the diameter size of the pocket orifices 29 will be too large and the rollers 26 tend to play. Moreover, from the viewpoint of the retainer 28, play tends to occur also in the retainer 28 because the rollers 26 are not capable of restraining the retainer 28 from moving in various directions. Furthermore, the roller 26 comes into contact with the pocket orifice 29 substantially at only one point as shown in FIG. 9B, which is a view of the pocket orifice 29 seen from the direction from which the roller 26 is inserted. As a result, the oil film may easily break because of the narrow line of contact along the bearing surface 21.

On the contrary, according to the present embodiment, since the tapered lip 38 is capable of eliminating the unnecessary gap between the roller 26 and the retainer 28, the play will be reduced, as shown in FIG. 10A. Moreover, the retainer 28 is held by the rollers 26 that are inserted from different directions as shown in FIG. 11A and FIG. 11B. Therefore, it is possible to prevent the play in the retainer 28, and thus prevent the retainer 28 from interfering the oscillating turret 20 or the ring assembly 7. Furthermore, as shown in FIG. 10B, which is a view of the pocket orifice 29 seen from the direction from which the roller 26 is inserted (refer to FIG. 10A), by forming the pocket orifice 29 in a curve along the bearing surface 21 of the roller 26 in the direction of the thickness of the retainer 28, it is possible bring the roller 26 in surface contact with the pocket orifice 29, or in a state in which an almost uniform clearance is maintained between the orifice 29 and the roller 26. As a result, it is possible to guarantee satisfactory oil film formation. According to the satisfactory oil film formation, the prevention of play in the retainer 28, and the prevention of play in the rollers 26, it is possible to further improve the precision of movement of the inclining-and-rotating table apparatus 1.

In this embodiment, the inner race 25 is formed by directly processing the oscillating turret 20, and the outer race 27 is formed in the ring assembly 7 that is attached to the device support portion 18a surrounding the oscillating turret 20. However, when the device support portion 18a has the shaft-like portion and the oscillating turret 20 is attached surrounding this shaft-like portion, it is needless to say that the inner race 25 can be formed in the device support portion 18a and the outer race 27 can be formed by directly processing the oscillating turret 20.

Further, the inclining and rotating table apparatus 1 of this embodiment uses a cross roller bearing 30 also for the bearing structure between the rotating table 12 and the support base 14. The oscillating turret 20, the ring assembly 7, the roller gear cam 50, cam followers 24, the first V-shaped groove 34, the second V-shaped groove 32, and the rollers 26 of the cross roller bearing 31 correspond, respectively, to the turret 9, the ring assembly 11 for the table, the roller gear cam 48, cam followers 8, the third V-shaped groove 54, the fourth V-shaped groove 52, and the rollers 23 of the cross roller bearing 30.

Namely, the rotating table device 10 comprising the cross roller bearing 30 is directly processed in the turret 9, and therefore, it is possible to form the inner race close to a perfect circle with no processing distortions. Thus, it is possible to match the rotation center of the turret 9 with the core of the inner race of the cross roller bearing 30, and thereby eliminate any positional misalignment between the turret 9 and the bearing 30. Further, the causes of deterioration of precision in a conventional bearing structure can be completely eliminated, and it becomes possible to realize a rotating table device having an extremely high precision in movement. Furthermore, a single cross roller bearing 30 will be able to support both the thrust load and the radial load applied to the turret 9, thus providing for a simplified rotating table device having few assembly errors. In cooperation with the oscillating mechanism of the rotating table device described above, it becomes possible to realize an inclining and rotating table apparatus with an even higher operational precision, thereby enabling higher precision in processing.

As described above, considering their structures, it is advantageous to adopt the cross roller bearings 30, 31 in inclining and rotating table apparatuses that require high precision in positioning operation. In particular, as illustrated in the above embodiment, cross roller bearings 30, 31 are used respectively for the rotating mechanism portion of the rotating table device 10 and the oscillating mechanism portion that makes the rotating table device 10 oscillate. In this way, it becomes possible to process, with high precision, a complicated continuous three-dimensional curved surface. Further, in the inclining and rotating table apparatus that uses a globoidal cam, play does not occur, even during continuously cutting and processing, as with the case where a gear mechanism is merely used. Therefore, by using the abovementioned inclining and rotating table apparatus, a smooth continuous curve can be easily processed, and it becomes possible to obtain excellent performance.

===Second Embodiment===

Figure 16:
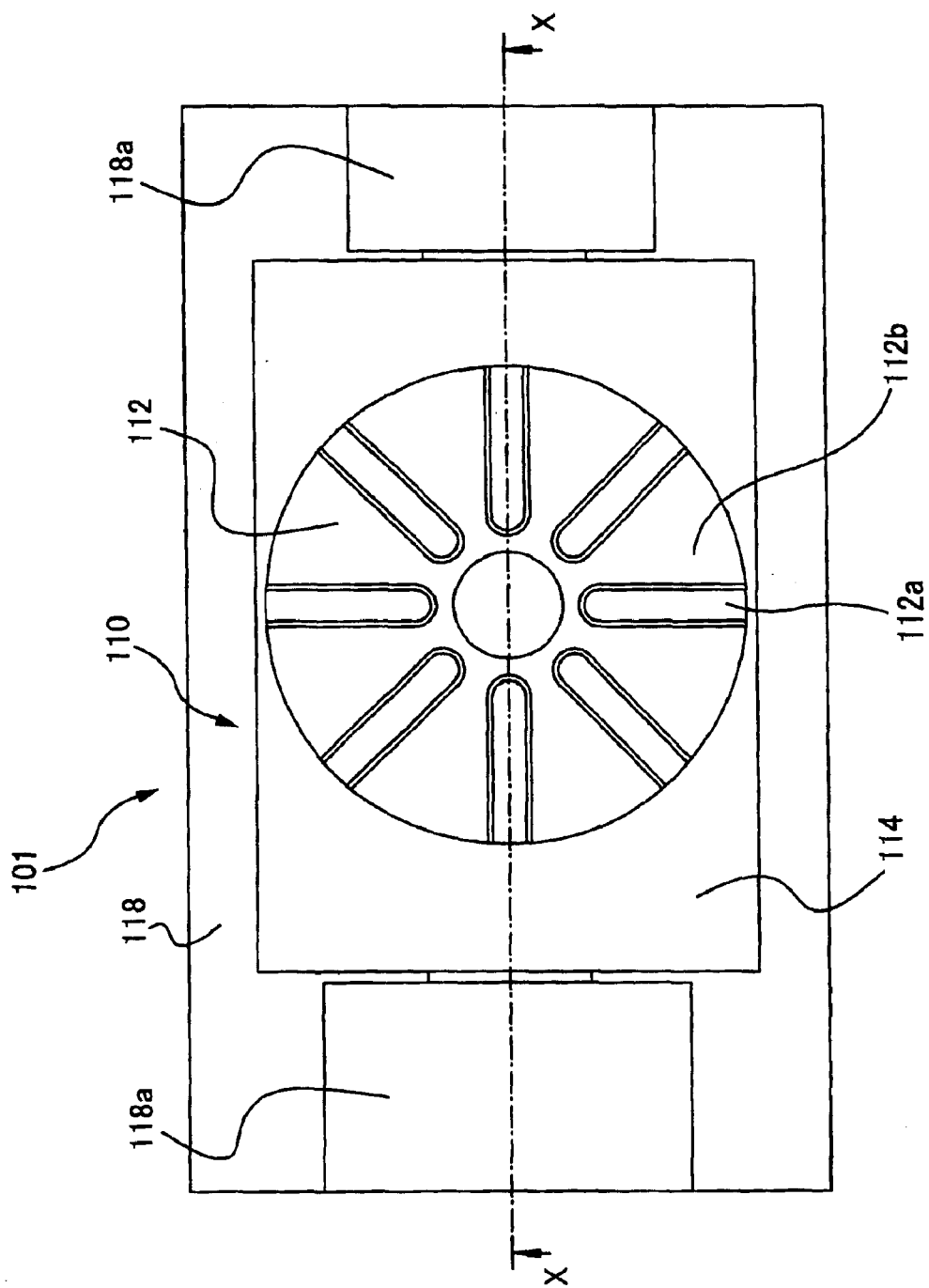
FIG. 16 is a plan view of the inclining and rotating table apparatus according to a second embodiment.
Figure 17:
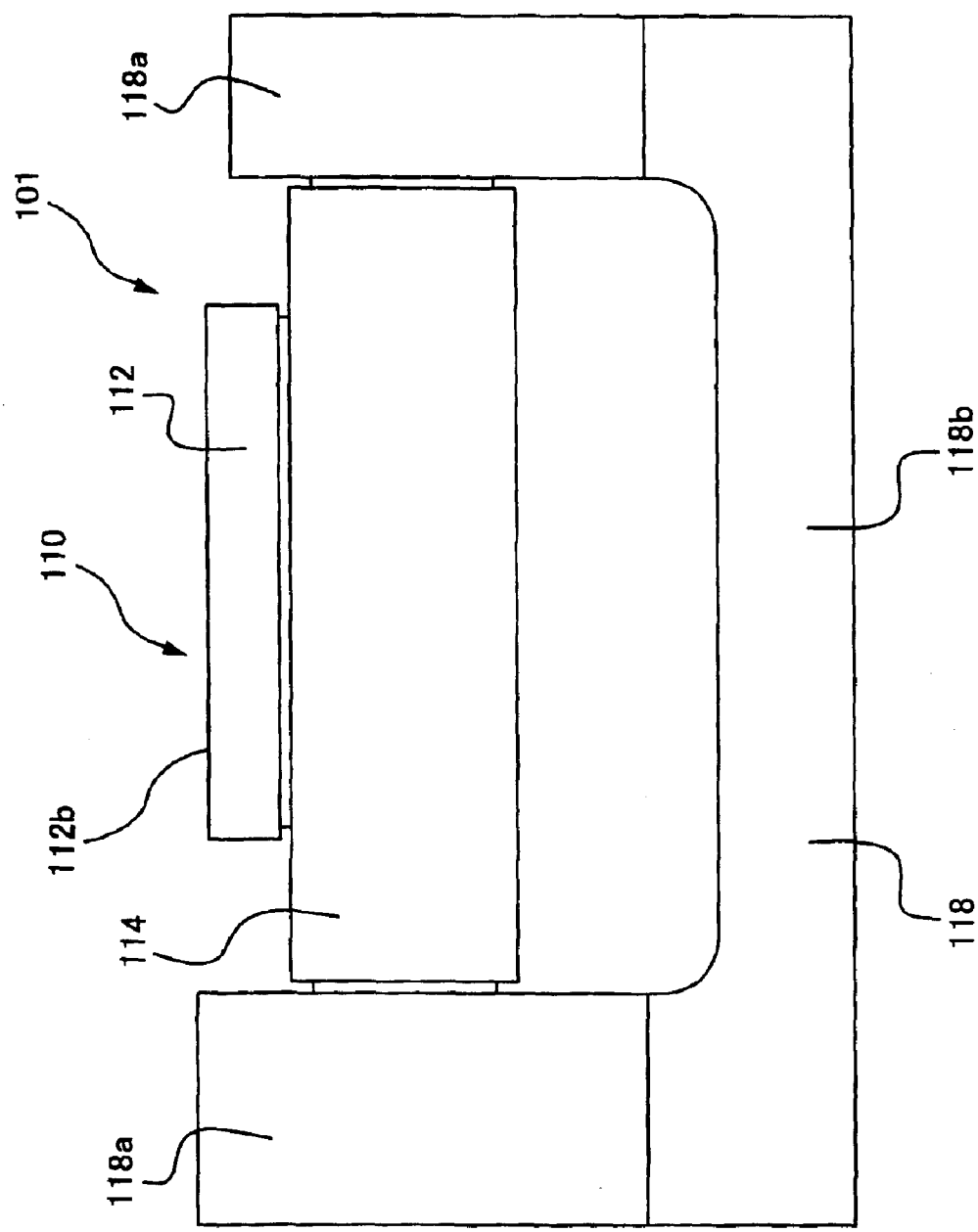
FIG. 17 is a front view of the inclining and rotating table apparatus according to the second embodiment.
Figure 18:
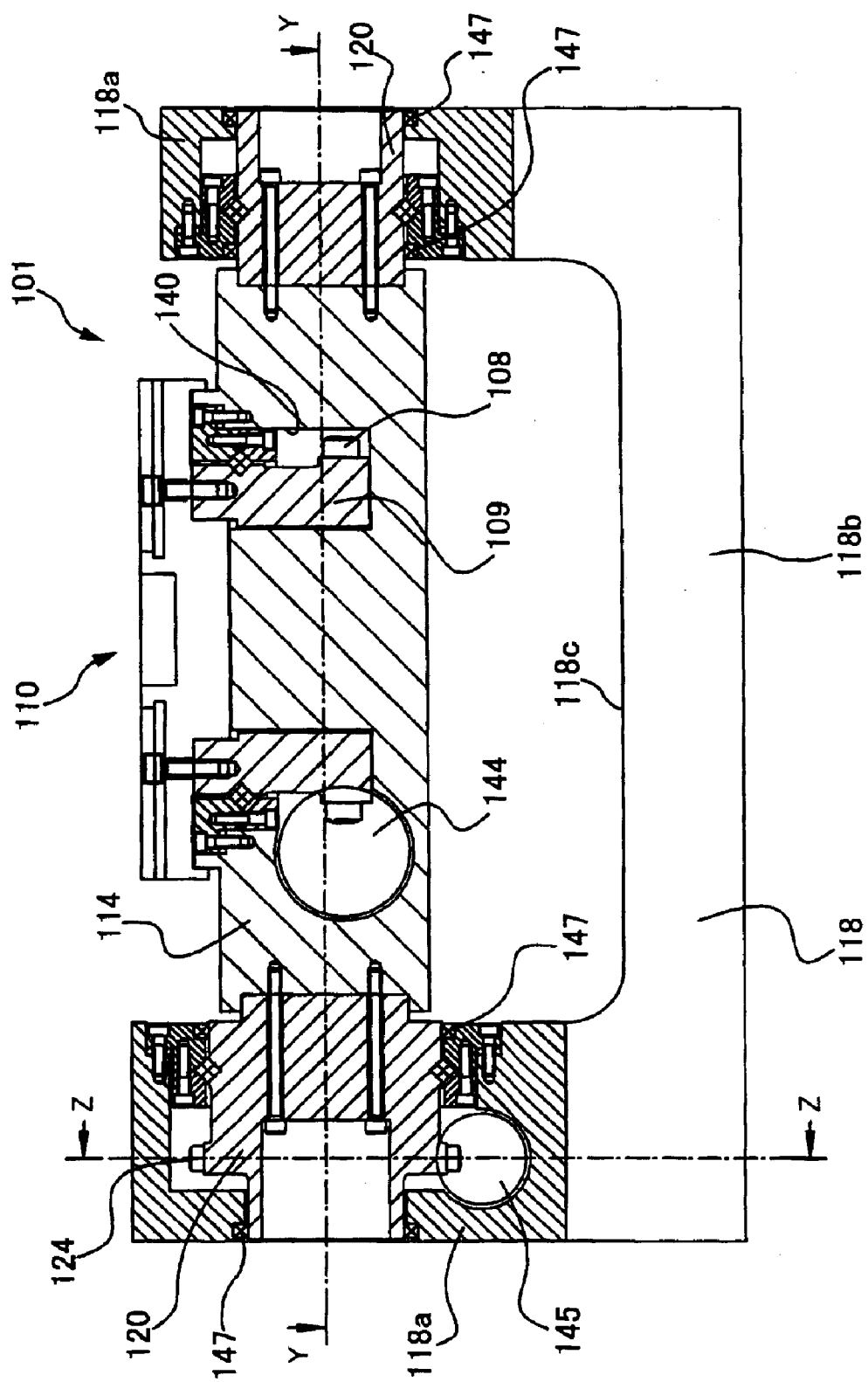
FIG. 18 is a cross sectional view of FIG. 16 taken along line X—X.
Figure 19:
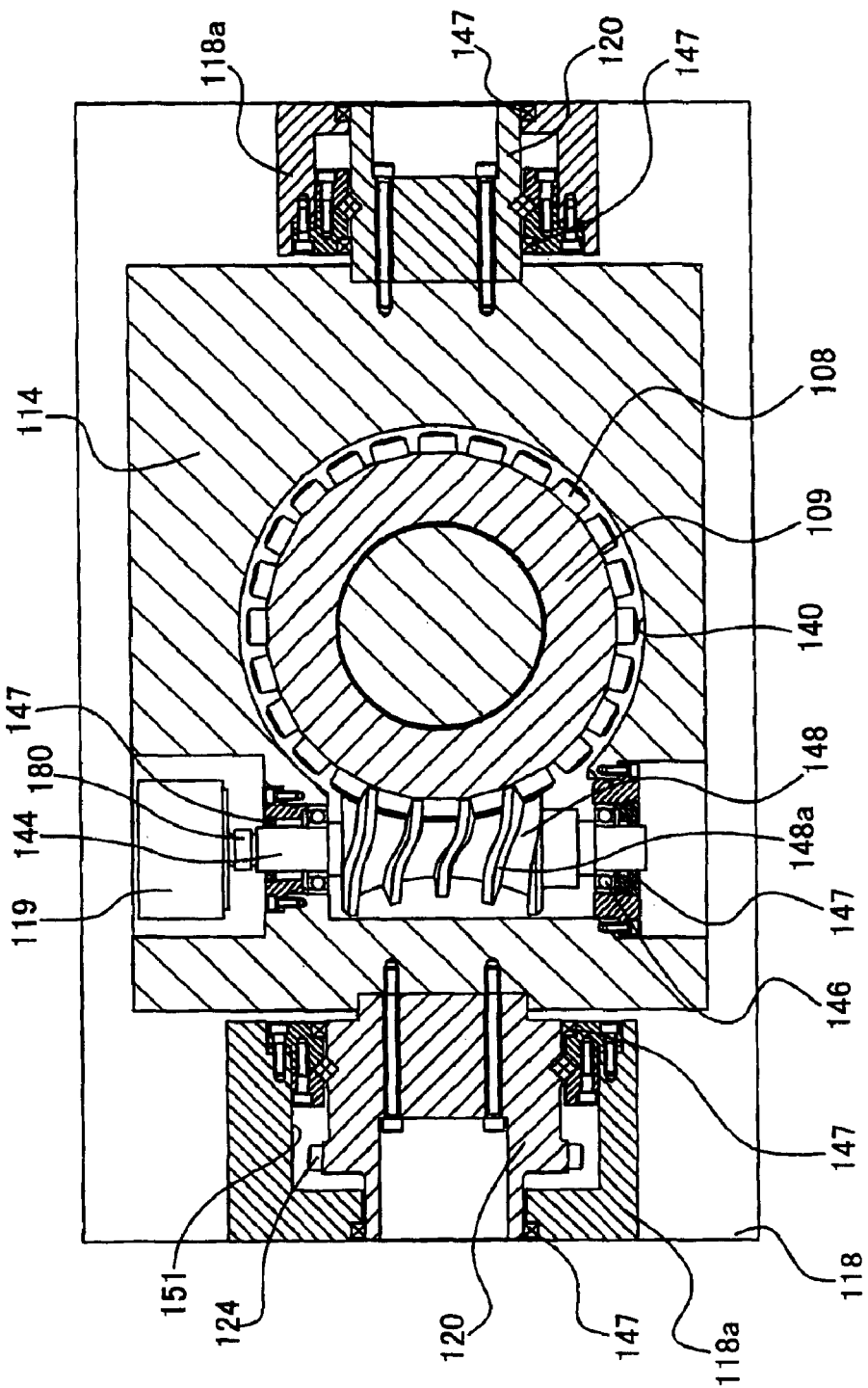
FIG. 19 is a cross sectional view of FIG. 18 taken along line Y—Y.
Figure 20:
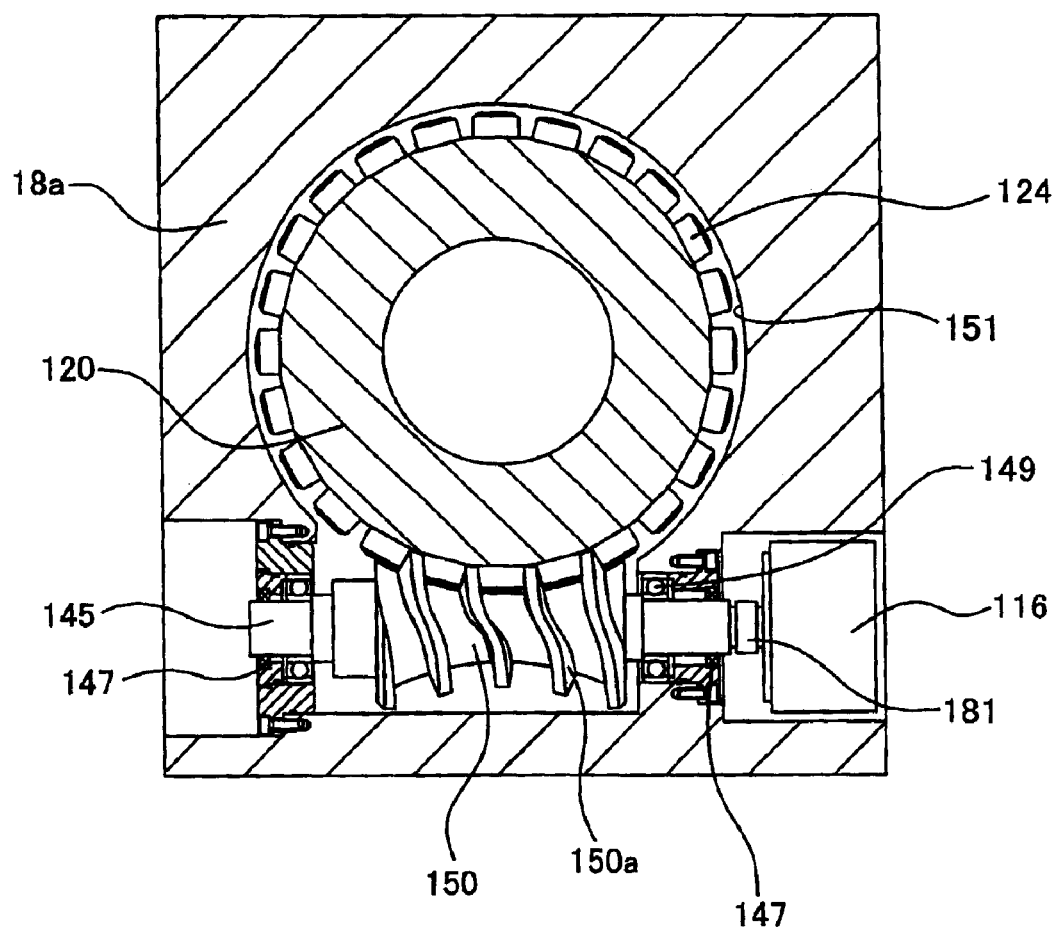
FIG. 20 is a cross sectional view of FIG. 18 taken along line Z—Z.

Hereinbelow, the second embodiment of the present invention will be explained in detail with reference to the attached drawings. FIG. 16 through FIG. 20 depict a second embodiment of an inclining and rotating table apparatus of the present invention. FIG. 16 is a plan view of an inclining and rotating table apparatus according to the second embodiment, FIG. 17 is a front view of the inclining and rotating table apparatus according to the second embodiment, FIG. 18 is a cross sectional view of FIG. 16 taken long line X—X, FIG. 19 is a cross sectional view of FIG. 18 taken long line Y—Y, and FIG. 20 is a cross sectional view of FIG. 18 taken along line Z—Z.

The inclining and rotating table apparatus 101 of the second embodiment also comprises, for example: a rotating table device 110 that comprises a rotating table 112 as a rotating table that rotates while holding a workpiece that is processed by, for example, a three-dimensional machining center, and a support base 114 that rotatably supports the rotating table 112; and a base 118 rotatably supporting the support base 114 in order to make the rotating table device 110 oscillate.

As described above, the rotating table device 110 comprises the rotating table 112 that holds the workpiece, and the support base 114 that rotatably supports the rotating table 112. As shown in FIG. 16, an upper surface of the rotating table 112, namely a table surface 112b, is provided with slide grooves 112a for sliding a block that structures a chuck for holding the workpiece. These slide grooves 112a are provided radially from the center of the rotating table 112. Cross roller bearings 130 are used as the bearing for this rotating table 112 and the support base 114. The structure of the cross roller bearing 130 is the same as the structure adopted in the first embodiment. Note that, also in this embodiment, the slide grooves 112a (and chucks) structure a holding mechanism for holding the workpiece.

A turret 109, which structures a shaft portion serving as a rotating shaft, is provided below a lower surface of the rotating table 112. At the lower portion of the outer peripheral surface of the turret 109 are provided a plurality of cam followers 108 that are arranged at regular intervals along the peripheral direction of the turret 109.

A drive shaft 144 for inputting drive force to the rotating table 112 is rotatably supported to the support base 114 by a pair of bearing members 146. This drive shaft 144 is provided with a roller gear cam 148, which serves as a cam. This roller gear cam 148 has a cam surface 148a whose phase is displaced in the axial direction as the drive shaft 144 rotates, and this cam surface 148a and the cam followers 108 of the turret 109 mesh with each other. Here, as the roller gear cam mechanism, there is used a globoidal cam that does not cause backlash not only when it is stopped, but also when it is indexing. A hole 140 in the support base 114 is provided with oil for lubricating the roller gear cam 148 and the cam followers 108.

In the second embodiment, a motor 119 is arranged so that the axis of the output shaft matches the axis of the drive shaft 144. The motor 119 is connected to the drive shaft 144 via a coupling 180. Therefore, the power of the motor 119 is transmitted to the drive shaft 144 without using gears. Note that, the motor 119 is arranged so that it cannot be seen from outside the support base 114.

With such a structure, it becomes possible to make the rotating table device 110 small. Further, since the gears will becomes unnecessary, the number of components can be lessened. Further, the rotating table device 110 will be reduced in weight, and therefore, the output of the power source for driving the rotating table device 110 can also be reduced. Further, the problems unique to gears, such as decreased precision due to backlash or decreased precision due to distortion in the gear itself, will not occur, and therefore, positioning precision will increase.

When power of the motor 119 is transmitted to the drive shaft 144, the drive shaft 144 rotates with respect to the support base 114. When the drive shaft 144 rotates, the roller gear cam 148 also rotates, and the cam followers 108, which mesh with the roller gear cam 148, subsequently engage with the cam surface 148a. The rotation drive force is thus transmitted to the rotating table 112, and the rotating table 112 rotates around the rotation axis of the turret 109.

The support base 114 has a rectangular shape in a plan view. A cylindrical oscillating turret 120, which structures a shaft body serving as the rotating shaft, protrudes from the surface of each opposite side of the support base 114. These two oscillating turrets 120 are arranged so the axis of one of the turrets is on the same line as the axis of the other turret, and are provided in a direction perpendicular to the rotation axis of the rotating table 112. These oscillating turrets 120 are supported by the base 118, and the rotating table device 110 oscillates, using the oscillating turrets 120 as the shafts for oscillation.

The base 118 comprises a base portion 118b positioned below the rotating table device 110, and two device support portions 118a that are provided on the base portion 118b. The two device support portions 118a are arranged on the sides of the oscillating turrets 120 so as to sandwich the rotating table device 110. In the rotating table device 110, which is arranged in between the device support portions 118a, the oscillating turrets 120 are rotatably supported in between the device support portions 118a and are made to oscillate, making the table surface 112b incline. Further, the base portion 118b in between the two device support portions 118a is formed with a recessed portion 118c on its top surface, so that when the rotating table device 110 oscillates, the lower part of the support base 114 does not contact the base portion 118b.

An input shaft 145, which serves as an input shaft body for inputting drive force to make the rotating table device 110 oscillate, is rotatably supported with respect to the base 118 by a pair of bearing members 149. This input shaft 145 is provided with a roller gear cam 150, which serves as a cam. This roller gear cam 150 has a cam surface 150a whose phase is displaced in the axial direction as the input shaft 145 rotates, and this cam surface 150a and cam followers 124 of the oscillating turret 120 mesh with each other. Here, as the roller gear cam mechanism, there is used a globoidal cam that does not cause backlash not only when it is stopped, and also when it is indexing.

A hole 151 in each device support portion 118a of the base 118 is provided with oil for lubricating the roller gear cam 150 and the cam followers 124. This oil is prevented from leaking outside of the base 118 by, for example, a seal member 147.

In the second embodiment, a motor 116 is arranged so that the axis of the output shaft matches the axis of the input shaft 145. The motor 116 is connected to the input shaft 145 via a coupling 181. Therefore, the power of the motor 116 is transmitted to the input shaft 145 without using gears. Note that, the motor 116 is arranged so that it cannot be seen from outside the base 118.

With such a structure, it becomes possible to make the inclining and rotating table apparatus 101 small. Further, since the gears will becomes unnecessary, the number of components can be lessened. Further, the problems unique to gears, such as decreased precision due to backlash or decreased precision due to distortion in the gear itself, will not occur, and therefore, positioning precision will increase.

When power of the motor 116 is transmitted to the input shaft 145, the input shaft 145 rotates with respect to the base 118. When the input shaft 145 rotates, the roller gear cam 150 also rotates, and the cam followers 124, which mesh with the roller gear cam 150, subsequently engage with the cam surface 150a. The rotation drive force is thus transmitted to the rotating table device 110, and the rotating table device 110 rotates around the axis of the oscillating turret 120.

Generally, the above-described cross roller bearing mainly utilizes a plurality of rolling bodies, or rollers. These rollers are formed in a cylindrical shape. Each of their rotating axes is oriented in a certain direction. The rollers are uniformly spaced and arranged in the circumferential direction of an annular gap that is formed between a rotating shaft body and a supporting body for supporting the rotating shaft body. The rollers are made, for example, to roll between an inner race of the inner ring installed to the internal rotating shaft body and an outer race of an outer ring installed to the external supporting body. In cases where the rotating shaft body is arranged on the outside and the supporting part is arranged on the inside, the inner ring is installed to the supporting body, and the outer ring is installed to the rotating shaft. Especially in a cross roller bearing, the rotating axis of each of the rollers is arranged so that it is inclined at an angle toward the rotation axis of the rotating shaft body, and also, the directions of the rotating axes of adjacent rollers are arranged so that they incline in opposite directions. A retainer is provided between the rotating shaft body and the supporting body in order to retain the rollers that roller therebetween. The basic structure of such a cross roller bearing is well known in the art.

The inclining and rotating table apparatus 101 of this embodiment uses cross roller bearings for the rotating mechanism of the rotating table 112 and the oscillating mechanism of the rotating table device 110, but its structure is similar to that of the first embodiment.

Although preferred embodiments of the present invention have been described in detail, it should be understood that various changes, substitutions, and alterations can be made therein without departing from spirit and scope of the inventions as defined by the appended claims.

What is the claimed is:

1. An inclining and rotating table apparatus comprising:
    a rotating table device having
        a rotating table, and
        a support base for rotatably supporting said rotating table, said support base having at least one shaft body that is provided in a direction perpendicular to a rotation axis of said rotating table; and
    a base for rotatably supporting said rotating table device using said shaft body as a rotation shaft, wherein:
    a table surface of said rotating table is inclined by making said rotating table device rotate;
    a first V-shaped groove is directly formed in said shaft body along the rotating direction thereof;

said base has a second V-shaped groove opposing said first V-shaped groove; and a cross roller bearing is structured by providing a plurality of rolling bodies between said shaft body and said base, said rolling bodies being placed in contact with said first V-shaped groove and said second V-shaped groove and being capable of rolling between said shaft body and said base, and arranging a rolling axis of a rolling body, among said rolling bodies, perpendicular to a rolling axis of an adjacent rolling body.

2. The inclining and rotating table apparatus as claimed in claim 1, further comprising:

an input shaft body for inputting power to said shaft body, said input shaft body having a cam surface whose phase is displaced in the axial direction of said input shaft body as said input shaft body rotates, wherein said shaft body has a plurality of cam followers, said cam followers being provided at regular intervals on the outer circumference of said shaft body in the circumferential direction thereof, and said cam followers being placed in contact with said cam surface of said input shaft body to roll therewith, and wherein rotation of said input shaft body causes said plurality of cam followers to subsequently engage said cam surface to make said rotating table device rotate.

3. The inclining and rotating table apparatus as claimed in claim 2, wherein said input shaft body is driven by a motor.

4. The inclining and rotating table apparatus as claimed in claim 3, wherein said motor is arranged so that it cannot be seen from outside said base.

5. The inclining and rotating table apparatus as claimed in claim 4, wherein:

power of said motor is transmitted to said input shaft body through a gear; and said gear is arranged so that it cannot be seen from outside said base.

6. The inclining and rotating table apparatus as claimed in claim 4, wherein power of said motor is transmitted to said input shaft body without using a gear.

7. The inclining and rotating table apparatus as claimed in claim 1, wherein:

said rotating table has a shaft portion as a center of rotation of said rotating table;

a third v-shaped groove is directly formed in said shaft portion along the rotating direction thereof;

said support base has a fourth V-shaped groove opposing said third v-shaped groove; and a cross roller bearing is structured by providing a plurality of rolling bodies between said shaft portion and said support base, said rolling bodies being placed in contact with said third V-shaped groove and said fourth V-shaped groove and being capable of rolling between said shaft portion and said support base, and arranging a rolling axis of a rolling body, among said rolling bodies, perpendicular to a rolling axis of an adjacent rolling body.

8. The inclining and rotating table apparatus as claimed in claim 7, further comprising:

a drive shaft for inputting power to said shaft portion, said drive shaft having a cam surface whose phase is displaced in the axial direction of said drive shaft as said drive shaft rotates, wherein said shaft portion has a plurality of cam followers, said cam followers being provided at regular intervals on the outer circumference of said shaft portion in the circumferential direction thereof, and said cam followers being placed in contact with said cam surface of said drive shaft to roll therewith, and wherein rotation of said drive shaft causes said plurality of cam followers to subsequently engage said cam surface to make said rotating table rotate.

9. The inclining and rotating table apparatus as claimed in claim 8, wherein said drive shaft is driven by a second motor.

10. The inclining and rotating table apparatus as claimed in claim 9, wherein said second motor is arranged so that it cannot be seen from outside said support base.

11. The inclining and rotating table apparatus as claimed in claim 10, wherein:

power of said second motor is transmitted to said drive shaft through a gear; and said gear is arranged so that it cannot be seen from outside said support base.

12. The inclining and rotating table apparatus as claimed in claim 10, wherein power of said second motor is transmitted to said drive shaft without using a gear.

13. The inclining and rotating table apparatus as claimed in claim 1, wherein:

one of said at least one shaft body is provided on said support base on one side of said rotating table device, and another one of said at least one shaft body is provided on said support base on the other side of said rotating table device;

said first V-shaped groove is directly formed in said shaft body provided on said one side;

a fifth V-shaped groove is directly formed in said shaft body provided on said other side; and said base has a sixth v-shaped groove opposing said fifth V-shaped groove.

14. An The inclining and rotating table apparatus as claimed in claim 1, wherein:

said rotating table has a holding mechanism for holding a workpiece; and said workpiece held by said holding mechanism is made to incline and rotate by making said rotating table rotate, and making said table surface of said rotating table incline by making said rotating table device rotate.

* * * * *